(12) United States Patent
Jia et al.

(10) Patent No.: US 11,892,467 B2
(45) Date of Patent: Feb. 6, 2024

(54) ACCELEROMETER WITH TRANSLATIONAL MOTION OF MASSES

(71) Applicant: Analog Devices, Inc., Wilmington, MA (US)

(72) Inventors: Kemiao Jia, Tolland, CT (US); Xin Zhang, Acton, MA (US); Michael Judy, Ipswich, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 17/555,002

(22) Filed: Dec. 17, 2021

(65) Prior Publication Data

US 2022/0196699 A1    Jun. 23, 2022

Related U.S. Application Data

(60) Provisional application No. 63/127,822, filed on Dec. 18, 2020.

(51) Int. Cl.
*G01P 15/125*    (2006.01)
*G01P 1/00*    (2006.01)

(52) U.S. Cl.
CPC .............. *G01P 15/125* (2013.01); *G01P 1/00* (2013.01)

(58) Field of Classification Search
CPC .................................................. G01P 15/125
See application file for complete search history.

(56) References Cited

U.S. PATENT DOCUMENTS

| 6,705,167 | B2 | 3/2004 | Kvisteroey et al. |
| 7,210,351 | B2 | 5/2007 | Lo et al. |
| 7,367,232 | B2 | 5/2008 | Vaganov et al. |

(Continued)

FOREIGN PATENT DOCUMENTS

| CN | 103543292 B | 6/2006 |
| CN | 101231303 A | 7/2008 |

(Continued)

OTHER PUBLICATIONS

Acar, Design Concept and Preliminary Experimental Demonstration of 4-DOF MEMS Gyroscope. University of California Irvine. Qualifying Examination Report, dated Mar. 7, 2002, No. MSL-01006. 65 pages.

(Continued)

*Primary Examiner* — Walter L Lindsay, Jr.
*Assistant Examiner* — Andrew V Do
(74) *Attorney, Agent, or Firm* — Wolf, Greenfield & Sacks, P.C.

(57) ABSTRACT

A microelectromechanical systems (MEMS) accelerometer is provided, comprising a substrate disposed in a plane defined by a first axis and a second axis perpendicular to the first axis; a first proof mass and a second proof mass coupled to the substrate and configured to translate in opposite directions of each other along a third axis perpendicular to the first and second axes; and at least one lever coupling the first proof mass to the second proof mass, wherein, the MEMS accelerometer is configured to detect acceleration along the third axis via detection of translation of the first and second proof masses along the third axis; and the MEMS accelerometer exhibits symmetry about the first and second axes.

18 Claims, 16 Drawing Sheets

(56) References Cited

U.S. PATENT DOCUMENTS

| | | | |
|---|---|---|---|
| 7,461,552 | B2 | 12/2008 | Acar |
| 7,621,183 | B2 | 11/2009 | Seeger et al. |
| 7,677,099 | B2 | 3/2010 | Nasiri et al. |
| 8,020,443 | B2 | 9/2011 | Lin et al. |
| 8,047,075 | B2 | 11/2011 | Nasiri et al. |
| 8,215,168 | B2 | 7/2012 | Merz et al. |
| 8,220,330 | B2 | 7/2012 | Miller et al. |
| 8,973,439 | B1 | 3/2015 | Baldasarre et al. |
| 9,069,004 | B2 | 6/2015 | Bhave et al. |
| 9,246,017 | B2 | 1/2016 | Van der Heide et al. |
| 9,400,337 | B2 | 7/2016 | Jones et al. |
| 9,720,012 | B2 | 8/2017 | Tang et al. |
| 10,209,072 | B2 | 2/2019 | Stephanou et al. |
| 10,429,407 | B2 | 10/2019 | Tang |
| 10,473,686 | B2 | 11/2019 | Zhang |
| 10,520,313 | B2 | 12/2019 | Törmälehto |
| 10,585,111 | B2 | 3/2020 | Zhang et al. |
| 10,816,569 | B2 | 10/2020 | Zhang et al. |
| 11,099,207 | B2 | 8/2021 | Zhang |
| 11,255,873 | B2 | 2/2022 | Zhang et al. |
| 2007/0034007 | A1 | 2/2007 | Acar |
| 2011/0265568 | A1 | 11/2011 | Stephanou et al. |
| 2012/0125104 | A1 | 5/2012 | Qiu et al. |
| 2014/0224016 | A1 | 8/2014 | Leclerc |
| 2016/0334215 | A1 | 11/2016 | Kato |
| 2017/0108336 | A1 | 4/2017 | Boysel |
| 2018/0023952 | A1 | 1/2018 | Ahmed et al. |
| 2019/0025056 | A1 | 1/2019 | Hughes et al. |
| 2019/0187169 | A1* | 6/2019 | Tang ............... G01P 15/18 |
| 2019/0310087 | A1* | 10/2019 | Gregory ........... G01C 19/5712 |
| 2020/0025790 | A1 | 1/2020 | Reinke |
| 2020/0081029 | A1 | 3/2020 | Zhang et al. |
| 2020/0096538 | A1 | 3/2020 | Zhang et al. |
| 2020/0355722 | A1 | 11/2020 | Zou et al. |
| 2020/0408801 | A1 | 12/2020 | Vohra et al. |

FOREIGN PATENT DOCUMENTS

| | | |
|---|---|---|
| CN | 101930876 A | 12/2010 |
| CN | 102084258 A | 6/2011 |
| CN | 102568923 A | 7/2012 |
| CN | 102608354 A | 7/2012 |
| CN | 103901227 B | 4/2014 |
| CN | 203587114 U | 5/2014 |
| CN | 208314017 U | 1/2019 |
| EP | 2 315 039 A1 | 4/2011 |
| WO | WO 2013/041959 A1 | 3/2013 |
| WO | WO 2013/091866 A1 | 6/2013 |

OTHER PUBLICATIONS

Benmessaoud et al., Optimization of MEMS capacitive accelerometer. Microsystem Technologies, Mar. 1, 2013. vol. 19, pp. 713-720.

Chen, A Research of Portable Electronic Device Gesture Recognition Technology Based on Mems Inertial Sensors. School of Mechatronics Engineering of UESTC (University of Electronic Science and Technology of China). Master Thesis Jun. 29, 2013. 91 pages.

Hsu et al., New Capacitive Low-G Triaxial Accelerometer With Low Cross-Axis Sensitivity. J. Micromech. and Microeng, Apr. 23, 2010. vol. 20, No. 5. https://doi.org/10.1088/0960-1317/20/5/055019.

Kaya et al., Design of a MEMS Capacitive Comb-drive Accelerometer. University of Michigan. COMSOLConference in Boston, 2011. 6 pages.

Zega et al., 3D-printing and wet metallization for uniaxial and multi-axial accelerometers. IEEE Xplore. 19th International Conference on Thermal, Mechanical and Multi-Physics Simulation and Experiments in Microelectronics and Microsystems (EuroSimE), Apr. 15-18, 2018, pp. 1-4.

Zhang et al., Microfabricated Capacitive Vacuum Sensor Based on MEMS. Xiamen University. Micronanoelectronic Technology, Feb. 2008. vol.45 No. 2. p. 104-8.

International Search Report and Written Opinion dated Mar. 18, 2022 in connection with International Application No. PCT/US21/64207.

* cited by examiner

ACCELEROMETER WITH TRANSLATIONAL MOTION OF MASSES

CROSS-REFERENCE TO RELATED APPLICATIONS

This application claims the benefit under 35 U.S.C. § 119(e) of U.S. Provisional Patent Application Ser. No. 63/127,822, filed Dec. 18, 2020, under Attorney Docket No. G0766.70315US00, and entitled "ACCELEROMETER WITH TRANSLATIONAL MOTION OF MASSES," which is hereby incorporated by reference herein in its entirety.

FIELD OF THE DISCLOSURE

The present application relates to microelectromechanical systems (MEMS) accelerometers.

BACKGROUND

Z-axis MEMS accelerometers are linear accelerometers which sense acceleration along the z-axis. Some such accelerometers have a teeter-totter construction, with a plate or beam that pivots about a central anchor in response to acceleration of the device in the z-direction.

SUMMARY

Some embodiments provide for a microelectromechanical systems accelerometer comprising: a substrate disposed in a plane defined by a first axis and a second axis perpendicular to the first axis; a first proof mass and a second proof mass coupled to the substrate and configured to translate in opposite directions of each other along a third axis perpendicular to the first and second axes; and at least one lever coupling the first proof mass to the second proof mass, wherein: the MEMS accelerometer is configured to detect acceleration along the third axis via detection of translation of the first and second proof masses along the third axis; and the MEMS accelerometer exhibits symmetry about the first and second axes.

Some embodiments provide for a microelectromechanical systems accelerometer, comprising: a substrate disposed in a plane defined by a first axis and a second axis perpendicular to the first axis; a first proof mass coupled to the substrate via an anchor disposed in a center of the MEMS accelerometer; and a second proof mass coupled to the substrate via the anchor and to the first proof mass, wherein: the first and second proof masses are configured to translate along a third axis perpendicular to the first and second axes in response to acceleration along the third axis; and the MEMS accelerometer exhibits symmetry about the first and second axes.

Some embodiments provide for a microelectromechanical systems device, comprising: a substrate disposed in a plane defined by a first axis and a second axis perpendicular to the first axis; a first proof mass coupled to the substrate; a second proof mass coupled to the substrate and to the first proof mass; first and second levers coupled to each of the first and second proof masses and disposed in line with each other, wherein: the first and second proof masses are configured to translate along a third axis perpendicular to the first and second axes in response to acceleration along the third axis; and the MEMS accelerometer exhibits symmetry about the first and second axes.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1A:
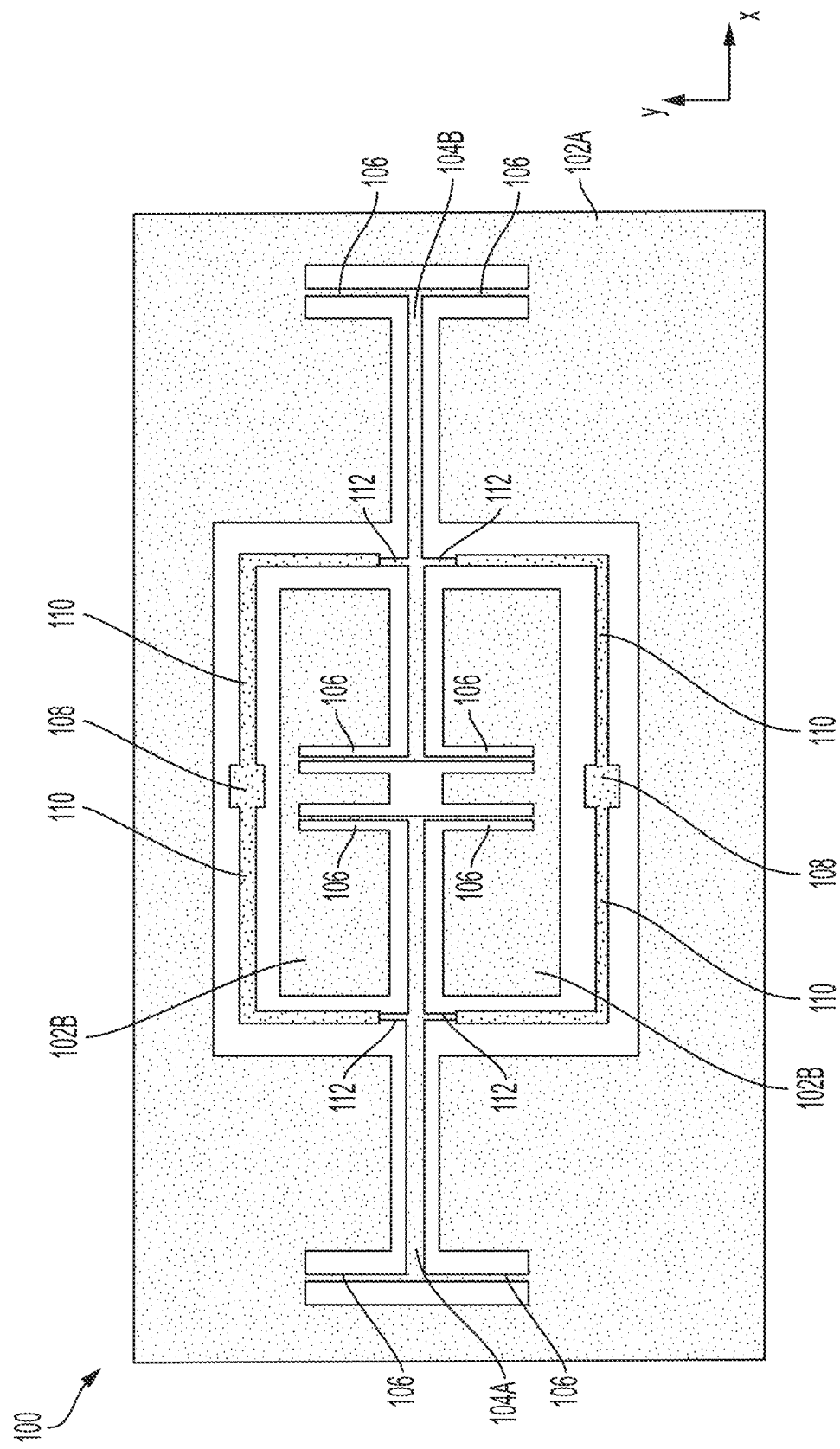
FIG. 1A illustrates a schematic diagram of an example MEMS device, according to some embodiments.

According to some aspects of the present application, a MEMS device which exhibits two-fold in-plane symmetry is provided. In particular, the MEMS device may be an accelerometer which exhibits symmetry about the x- and y-axes. The accelerometer described herein may be configured to sense acceleration along the z-axis by differential sensing of translational motion of at least two proof masses.

The MEMS accelerometer described herein may comprise an inner mass and outer mass coupled together by one or more levers and springs, the inner and outer masses being configured to translate in opposite directions along the z-axis in response to z-axis acceleration to generate a differential signal. The MEMS accelerometer may be configured to detect z-axis acceleration. For example, the one or more levers and springs may convert a tilt mode of the accelerometer to a translation mode, such that the movable masses move anti-phase to each other and perpendicular to an underlying substrate in response to acceleration along the z-axis. Electrodes disposed on the proof masses and the underlying substrate may measure displacement of the proof masses in order to detect the z-axis acceleration.

Notably, in at least some aspects of the present application the accelerometer exhibits a high degree of in-plane symmetry. For example, the accelerometer may be symmetric about the y-axis and the x-axis, thus exhibiting two-fold in-plane symmetry. The symmetry of the accelerometer may increase the accuracy of the accelerometer, for example, by reducing errors resulting from stress, offset, and/or cross-axis sensitivity.

Aspects of the accelerometer which may contribute to the in-plane symmetry and which are further described herein include (1) straight levers; (2) levers which are disposed in-line with each other; (3) a reduced number of anchors; (4) anchors which are shared among multiple levers, such as among levers that connect to each of the translating proof masses; (5) anchors which are in-line with one or more axes of symmetry (6) stationary beams coupled to anchors of the accelerometer; and (7) a single anchor shared among all levers of the accelerometer. Accelerometers according to different embodiments of the present application exhibit one or more such features.

For example, in some embodiments, aspects of the in-plane symmetry of the MEMS device are facilitated by at least two levers of the MEMS device being disposed in-line with each other. In some embodiments, aspects of the in-plane symmetry of the MEMS device are facilitated by one or more features of the anchors, such as positioning of the anchors in-line with at least one line of symmetry and/or at a center of mass of the MEMS device. In some embodiments, both aspects of the levers and the anchors facilitate the two-fold in-plane symmetry of the MEMS device. Aspects of the MEMS device which facilitate the increase in-plane symmetry of the MEMS device provide for reduced errors and increased sensing accuracy for the MEMS device.

FIG. 1A illustrates a schematic diagram of an example MEMS device, according to some embodiments. As shown in FIG. 1A, the MEMS device 100, which may be an accelerometer, comprises a first proof mass 102A and a second proof mass 102B.

As shown in FIG. 1A, the first and second proof masses 102A-102B lie in a plane defined by two perpendicular axes (in the illustrated embodiment, the x- and y-axes). The first and second proof masses 102A-102B are configured to translate along a third axis perpendicular to the plane (e.g., the z-axis, in the illustrated embodiment). The first and second proof masses 102A-102B may be configured to translate in opposite directions along the z-axis, also referred to herein as translating anti-phase. For example, the first proof mass 102A may move in a positive direction along the z-axis (e.g., out of the plane defined by the x- and y-axes) when the second proof mass 102B moves in a negative direction along the z-axis (e.g., into the plane defined by the x- and y-axes).

As described herein, the MEMS device 100 may be a MEMS accelerometer. The MEMS accelerometer may be configured to detect acceleration along the z-axis. In particular, the first and second proof masses 102A-102B may translate in opposite directions in response to an acceleration along the z-axis. Displacement of the first and second proof masses 102A-102B may be measured by electrodes coupled to the first and second proof masses 102A-102B and an underlying substrate (not shown), as described herein. The measured displacement of the first and second proof masses 102A-102B may be used to determine a measure of acceleration along the z-axis. As described herein, the first and second proof masses 102A-102B may be configured to translate anti-phase (e.g., in opposite directions) relative to each other. Accordingly, the signal measured by the electrodes may be a differential signal.

The first proof mass 102A may be disposed at least partially or entirely surrounding the second proof mass 102B. That is, as shown in the illustrated embodiment of FIG. 1A, the first proof mass 102A may surround the second proof mass 102B in the x-y plane. The second proof mass 102B may be disposed at least partially or entirely within the first proof mass. Accordingly, the first proof mass 102A may be referred to herein as an outer proof mass and the second proof mass 102B may be referred to herein as an inner proof mass. The outer proof mass 102B may act as a frame for the accelerometer. The inventors have recognized that the design of the inner and outer proof masses described herein provides for simpler fabrication than existing devices while still allowing the respective proof masses to translate anti-phase to obtain a differential signal.

The inner and outer masses may have unequal masses. For example, in some embodiments, the inner proof mass may be lighter than the outer proof mass. In other embodiments, the inner proof mass may be heavier than the outer proof mass. The imbalance of masses between the inner and outer mass may be maximized, for example to achieve higher sensitivity and lower thermomechanical noise.

In some embodiments, the first and second proof masses 102A-B may comprise multiple portions which move together. For example, in the illustrated embodiment, the second proof mass 102B comprises first and second portions coupled together by springs 106. The second proof mass 102B is bisected by the first and second levers 104A-B to form the first and second portions. In some embodiments, one or both of the first and second proof masses 102A-B may comprise a single portion. In some embodiments, one or both of the first and second proof masses 102A-B may comprise more than two portions. The first and second proof masses 102A-B and portions thereof may comprise any suitable shape.

Although the example MEMS accelerometer described herein has been described with reference to measuring acceleration along the z-axis, in other embodiments, the MEMS accelerometer may be configured to measure acceleration along one or more other axes, including the x-axis and/or the y-axis.

As shown in FIG. 1A, the first and second proof masses 102A, 102B may be coupled together by first and second levers 104A-B. In particular, first lever 104A is coupled to each of the first proof mass 102A and the second proof mass 102B at respective ends of the first lever 104A. Similarly, the second lever 104B is coupled to each of the first proof mass 102A and the second proof mass 102B at respective ends of the second lever 104B. The first and second levers 104A-B may comprise beams suspended over the underlying substrate.

The respective levers 104A-B may be coupled to the first and second proof masses 102A-B via springs 106. Springs 106 may comprise folded springs, in some embodiments, though in other embodiments other springs may be implemented. As shown in the illustrated embodiment, each of the first and second levers 104A-B are coupled to the first and second proof masses 102A-B with respective pairs of springs 106. However, in other embodiments, a single spring, or more than two springs, may be implemented in place of one or more of the respective pairs of springs.

The first and second levers 104A, 104B are configured to facilitate conversion of a tilt mode of the accelerometer into translational motion, such that the first and second proof masses 102A, 102B translate anti-phase to each other and perpendicular to an underlying substrate in response to z-axis acceleration. For example, when outer ends of the first and second levers 104A-B (e.g., ends of first and second levers 104A-B that are coupled to the first proof mass 102A) move upwards along the z-axis, inner ends of the first and second levers 104A-B (e.g., ends of the first and second levers 104A-B that are coupled to the second proof mass 102B) move downwards along the z-axis. In turn, when the first proof mass 102A moves upwards along the z-axis, the second proof mass 102B moves downwards along the z-axis. Likewise, when the outer ends of the first and second levers 104A-B (e.g., ends of first and second levers 104A-B that are coupled to the first proof mass 102A) move downwards along the z-axis, inner ends of the first and second levers 104A-B (e.g., ends of the first and second levers 104A-B that are coupled to the second proof mass 102B) move upwards along the z-axis. In turn, when the first proof mass 102A moves downwards along the z-axis, the second proof mass 102B moves upwards along the z-axis. Therefore, while the first and second levers 104A-B exhibit teeter-totter motion in response to acceleration along the z-axis, the proof masses 102A-B are configured to translate along the z-axis instead of operating in a tilt mode.

As described herein, the MEMS accelerometer 100 is symmetric in-plane about both the x- and y-axes. The in-plane symmetry of the MEMS device 100 may be facilitated by several features of the first and second levers 104A-B. For example, in some embodiments, including the illustrated embodiment, at least two levers of the MEMS accelerometer are disposed in-line with each other. In some embodiments, at least one lever of the MEMS accelerometer is disposed in-line with a line of symmetry of the MEMS accelerometer. In some embodiments, one or more additional pairs of in-line levers may be disposed parallel to a first pair of in-line levers. As shown in FIG. 1A, the levers 104A-B are disposed in-line with each other and intersect the second proof mass. In the illustrated embodiment, the first and second levers 104A-B are disposed horizontally in-line with the x-axis. In some embodiments, one or more (e.g., all) of the levers of the MEMS accelerometer may be straight (e.g., having no bends between endpoints of the lever). The positioning and configuration of the levers in-line with each other may facilitate the overall symmetry of the accelerometer, in some embodiments.

As described herein, the first and second proof masses 102A-B may be coupled to an underlying substrate. In particular, the MEMS device 100 may comprise at least one anchor, coupled to an underlying substrate, for coupling the first and second proof masses 102A-B to the underlying substrate. In the illustrated embodiment of FIG. 1A, the MEMS device comprises two anchors 108 disposed in-line with each other.

First and second proof masses 102A-B are coupled to each of the two anchors 108 via the first and second levers 104A-B. In particular, each of the first and second levers 104A-B are coupled to each of the two anchors 108 via tethers 112. In some embodiments, tethers 112 comprise springs (e.g., folded springs). That is, each proof mass of the first and second proof masses 102A-B is coupled to each of the anchors 108 via multiple connections (e.g., two connections per anchor, in the illustrated embodiment). The respective tethers may be coupled to a respective lever of the MEMS device at a midpoint of a length of the respective lever along the x-axis.

The MEMS device 100 may further comprise one or more anchor arms 110 coupled to an anchor 108 of the MEMS device 100. For example, as shown in the illustrated embodiment of FIG. 1A, each anchor 108 is coupled to a pair of anchor arms 110, disposed on opposite sides of the anchor 108. The anchor arms 110 may comprise rigid beams directly coupled to and extending outwardly from an anchor 108 to which the anchor arm 110 is coupled. The anchor arms 110 may be stationary relative to the other components of the MEMS device 100. The anchor arms 110 effectively extend the size of the space for connecting components to the anchors 108 while the actual size of the anchors 108 which are coupled to the substrate do not change. Therefore the anchor arms 110 may facilitate coupling multiple components to an anchor of the MEMS device 200 without needing to increase the number of anchors on the MEMS device 100 or consuming space on the underlying substrate.

The in-plane symmetry of the MEMS accelerometer may, in some embodiments, be facilitated by one or more additional features of the anchors of the MEMS accelerometer. For example, in some embodiments, the respective anchors are disposed in-line with at least one line of symmetry of the MEMS device. As shown in the illustrated embodiment, the anchors 108 are disposed in-line with each other and in-line with the y-axis. In some embodiments, the one or more anchors of the MEMS device may be in line with two lines of symmetry of the MEMS device (e.g., both the x- and y-axes).

Figure 5A:
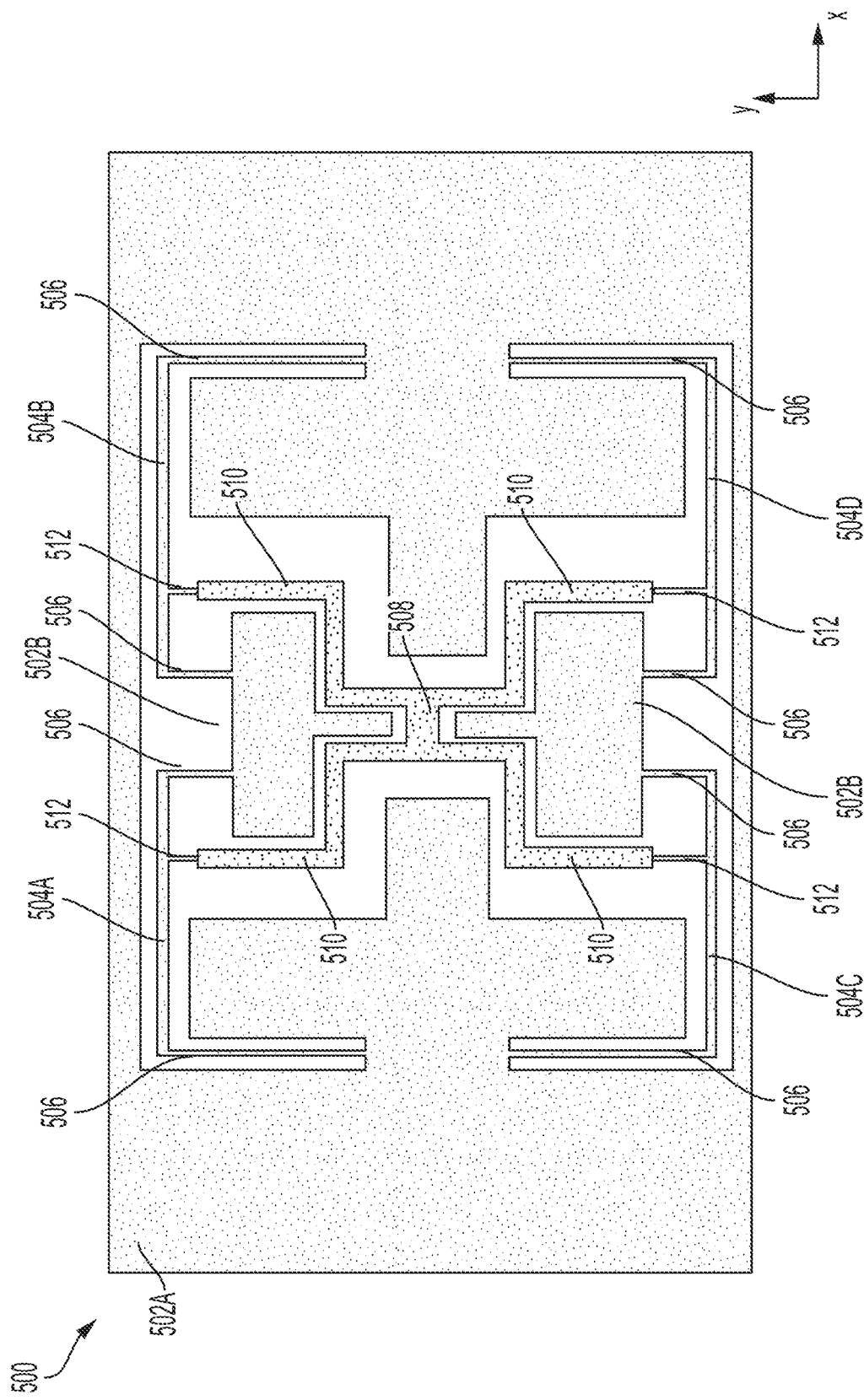
FIG. 5A illustrates a schematic diagram of a second example MEMS device, according to some embodiments.
Figure 5B:
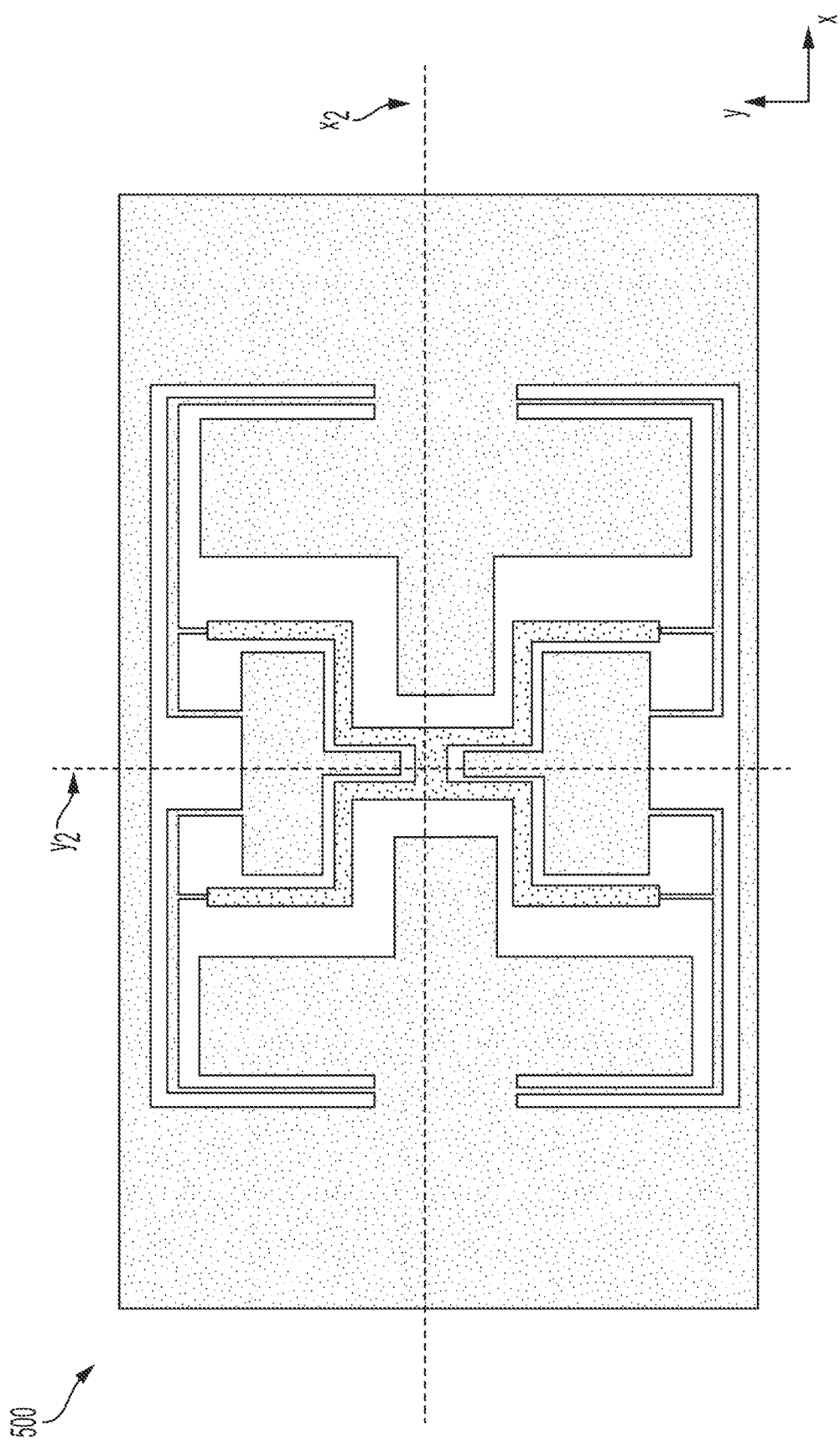
FIG. 5B is another schematic diagram of the MEMS device of FIG. 5A illustrating aspects of symmetry of the MEMS device, according to some embodiments.

In some embodiments, the one or more anchors of the MEMS device may be disposed at a center of mass of the MEMS device (e.g., a single anchor disposed in a middle of the MEMS device, as shown in FIG. 5A, described herein). In some embodiments, anchors of the MEMS device may be distributed, but may have a collective center of mass at a same location as a center of mass of the MEMS device (e.g., in the illustrated embodiment of FIG. 1A having two anchors which have a collective center of mass in a center of the MEMS device 100). The inventors have recognized that when anchors are offset from the center of mass, the MEMS device may experience signal offset issues. Accordingly, the MEMS devices described herein which dispose the one or more anchors either physically at a center of mass of the MEMS of device or such that a collective center of mass of multiple anchors is disposed at a center of mass of the MEMS device avoids potential issues with signal offset.

As shown in FIG. 1A, the MEMS device 100 comprises a small number of anchors. For example, the MEMS device 100 may comprise no more than two anchors. As shown in FIG. 1A, the anchors 108 may be shared among the first and second levers 104A-B of the MEMS device 100. That is, one anchor may be coupled via anchor arms 110 and tethers 112 to both the first lever 104A and the second lever 104B.

Figure 1B:
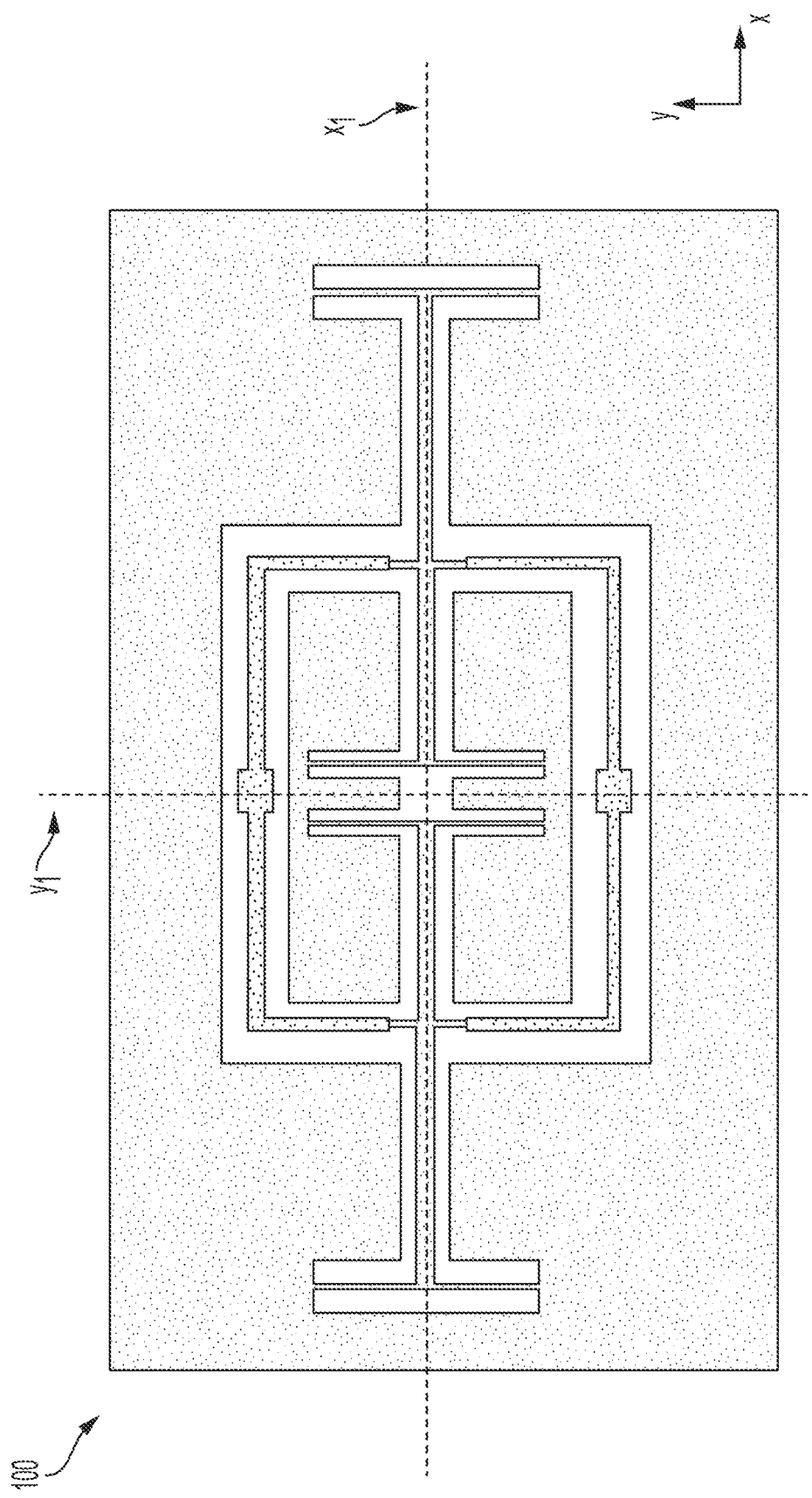
FIG. 1B is another schematic diagram of the MEMS device of FIG. 1A illustrating aspects of symmetry of the MEMS device, according to some embodiments.

FIGS. 1B-4 illustrate additional views of the example MEMS device 100 of FIG. 1A, according to some embodiments. FIG. 1B is a schematic diagram illustrating the in-plane symmetry of the MEMS device 100. As described herein, the MEMS device 100 is symmetric about both the x- and y-axes. FIG. 1B illustrates perpendicular $x_1$ and $y_1$ axes overlaid on the MEMS device 100 to illustrate the two-fold in-plane symmetry of the MEMS device 100.

Figure 1C:
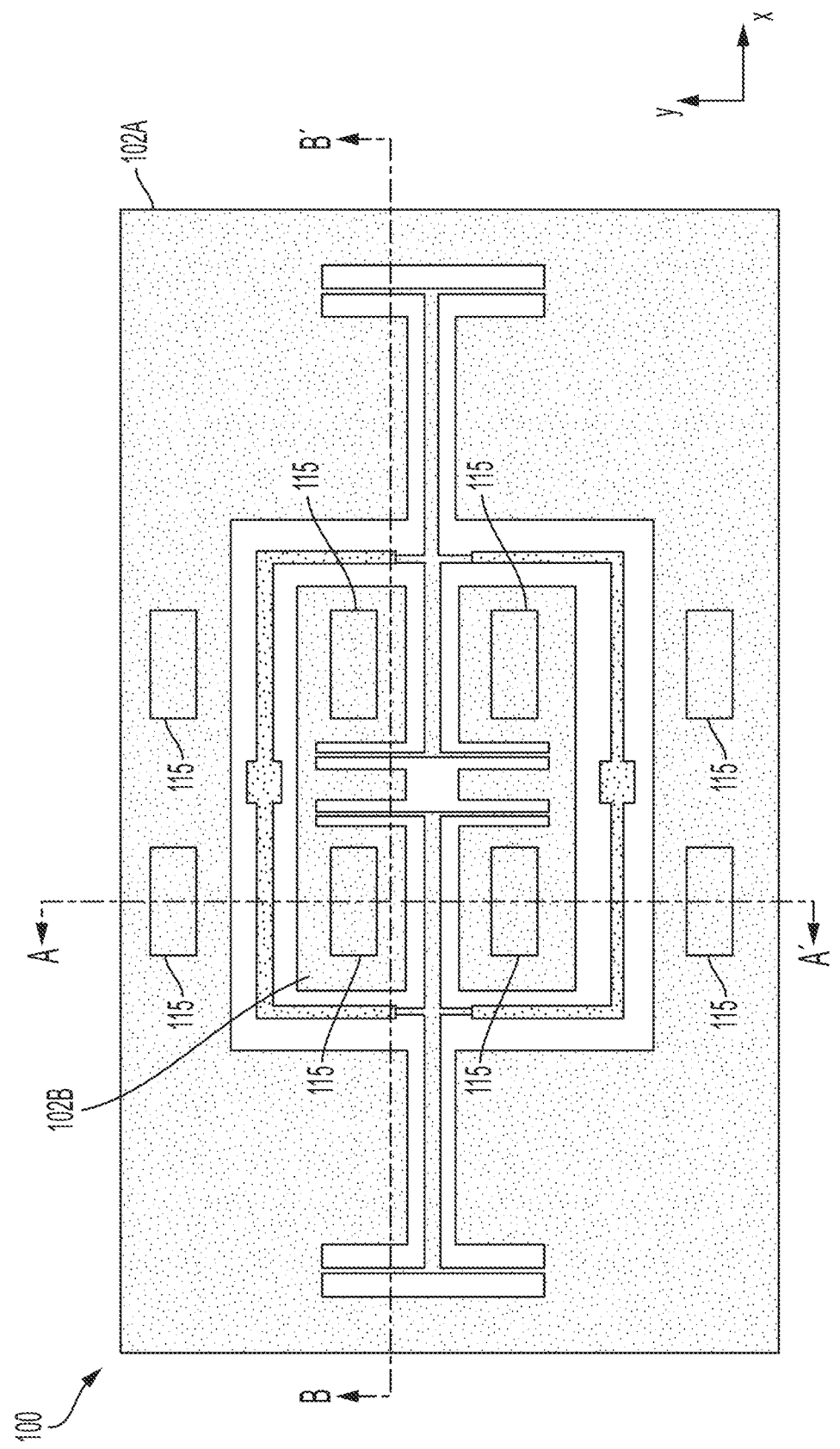
FIG. 1C is another schematic diagram of the MEMS device of FIG. 1A illustrating underlying electrodes of the MEMS device, according to some embodiments.

FIG. 1C is another schematic diagram of the MEMS device 100 illustrating underlying electrodes of the MEMS device 100, according to some embodiments. As described herein, the MEMS device 100 may comprise an underlying substrate distanced from the first and second proof masses 102A-B along the z-axis. Displacement of the first and second proof masses 102A-B may be measured by pairs of electrodes, with a first electrode of the pair disposed on the substrate (e.g., a top face of the substrate) and a second electrode of the pair disposed on one of the first or second proof masses 102A-B (e.g., on a bottom face of the respective proof mass). As the first and second proof masses 102A-B translate along the z-axis, a gap between the respective electrodes of a pair of electrodes changes. The change in gap results in a change in capacitance and therefore displacement of the respective proof masses may be determined based on the signals produced by the electrode pair.

FIG. 1C illustrates the positioning of electrodes 115 coupled to the substrate. As shown in FIG. 1C, there may be at least one electrode 115 disposed beneath each of the first and second proof masses 102A-B. In some embodiments, such as shown in the illustrated embodiment, there may be a plurality of electrodes 115 disposed beneath each of the first and second proof masses 102A-B.

As described herein, each of the electrodes 115 may be disposed opposite a complementary electrode coupled to an underside of one of the first or second proof masses 102A-B, such that the complementary electrode faces the respective electrode 115 coupled to the substrate. The inventors have recognized that positioning sensing electrodes on a single face of the proof masses simplifies fabrication while still generating a differential signal given the anti-phase translational motion of the first and second proof masses. The translational motion of the first and second proof masses, as opposed to teeter-totter motion allows for greater measured displacement, as the proof masses may move over substantially the entire gap distance between the respective electrodes, thereby giving higher sensitivity to the MEMS accelerometer described herein. By contrast, in a conventional teeter-totter accelerometer, the sense electrodes may be placed at edges of the proof masses (at the vicinity of the pivoting axis) where relatively less displacement is exhibited.

Figure 2A:
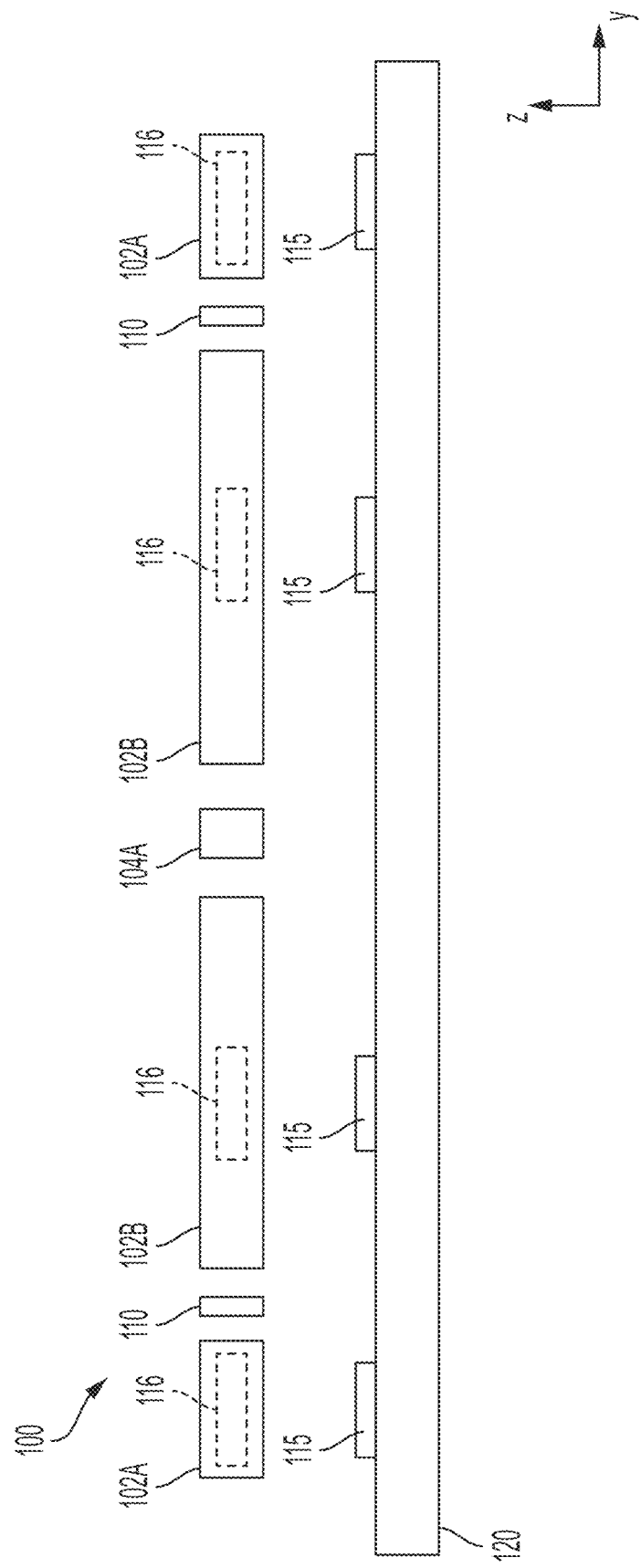
FIG. 2A is an example schematic diagram showing a cross-section of the MEMS device of FIG. 1A along the line A-A', according to some embodiments.

FIG. 2A is an example schematic diagram showing a cross-section of the MEMS device of FIG. 1 along the line A-A'. In the illustrated embodiment of FIG. 2A, the proof masses of the MEMS device 100 are at rest (e.g., not being displaced along the z-axis due to acceleration along the z-axis).

FIG. 2A illustrates the underlying substrate 120 and electrodes 116 coupled thereto. FIG. 2A illustrates the pairs of electrodes described herein. In particular, each electrode pair comprises an electrode 115 coupled to the substrate 120 and an electrode 116 coupled to a respective one of the first and second proof masses 102A-B.

Figure 2B:
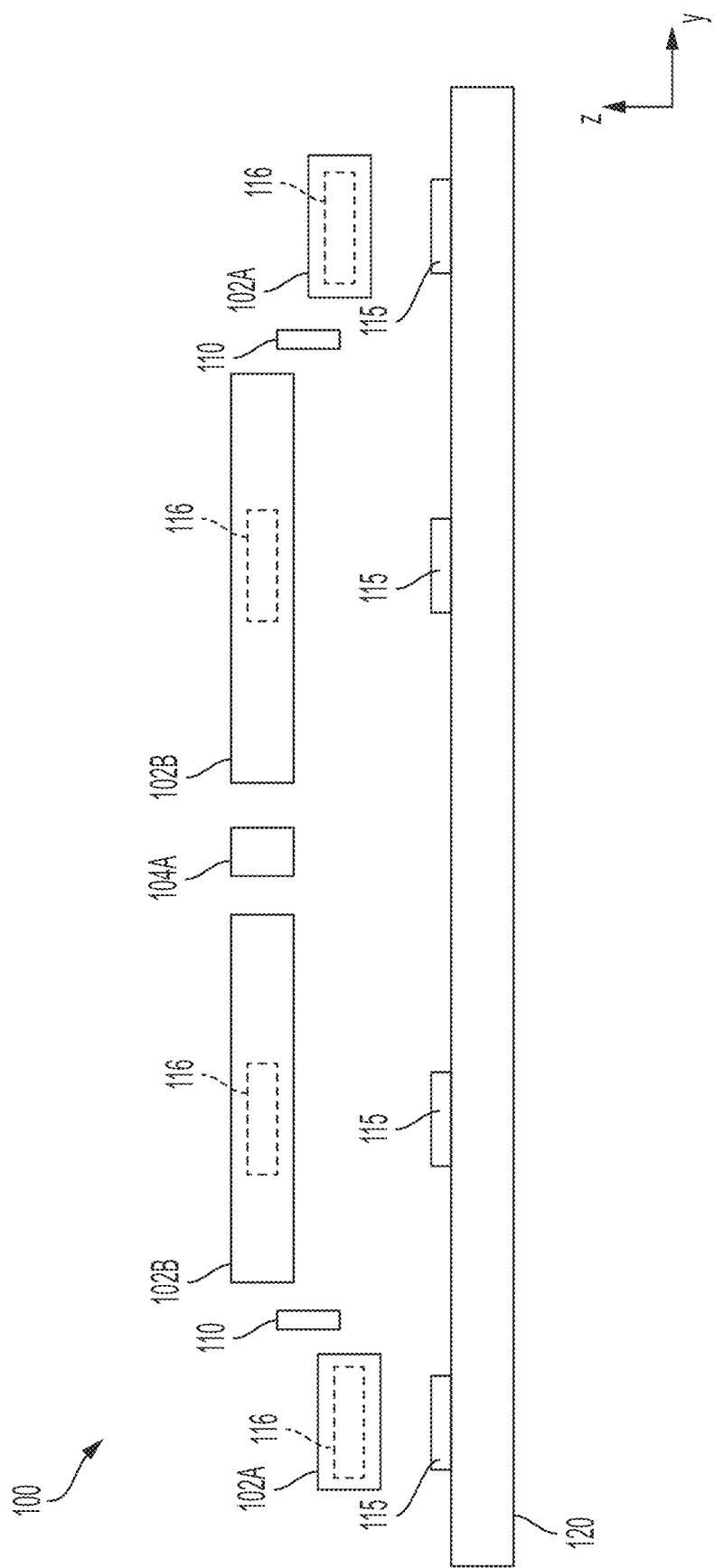
FIG. 2B is an example schematic diagram showing a cross-section of the MEMS device of FIG. 1A along the line A-A' during translational motion of the proof masses of the MEMS device, according to some embodiments.

FIG. 2B is an example schematic diagram showing a cross-section of the MEMS device of FIG. 1A along the line A-A' during translational motion of the proof masses of the MEMS device, according to some embodiments. FIG. 2A shows the MEMS device 100 while in motion due to an acceleration along the z-axis. In particular, FIG. 2A illustrates the MEMS device 100 where the first proof mass 102A is displaced downwards along the z-axis and the second proof mass 102B is displaced upwards along the z-axis. Displacement of the first and second proof masses 102A-B is measured differentially by the electrode pairs 115, 116. The acceleration is converted to translational motion via the levers 104A-B.

Figure 2C:
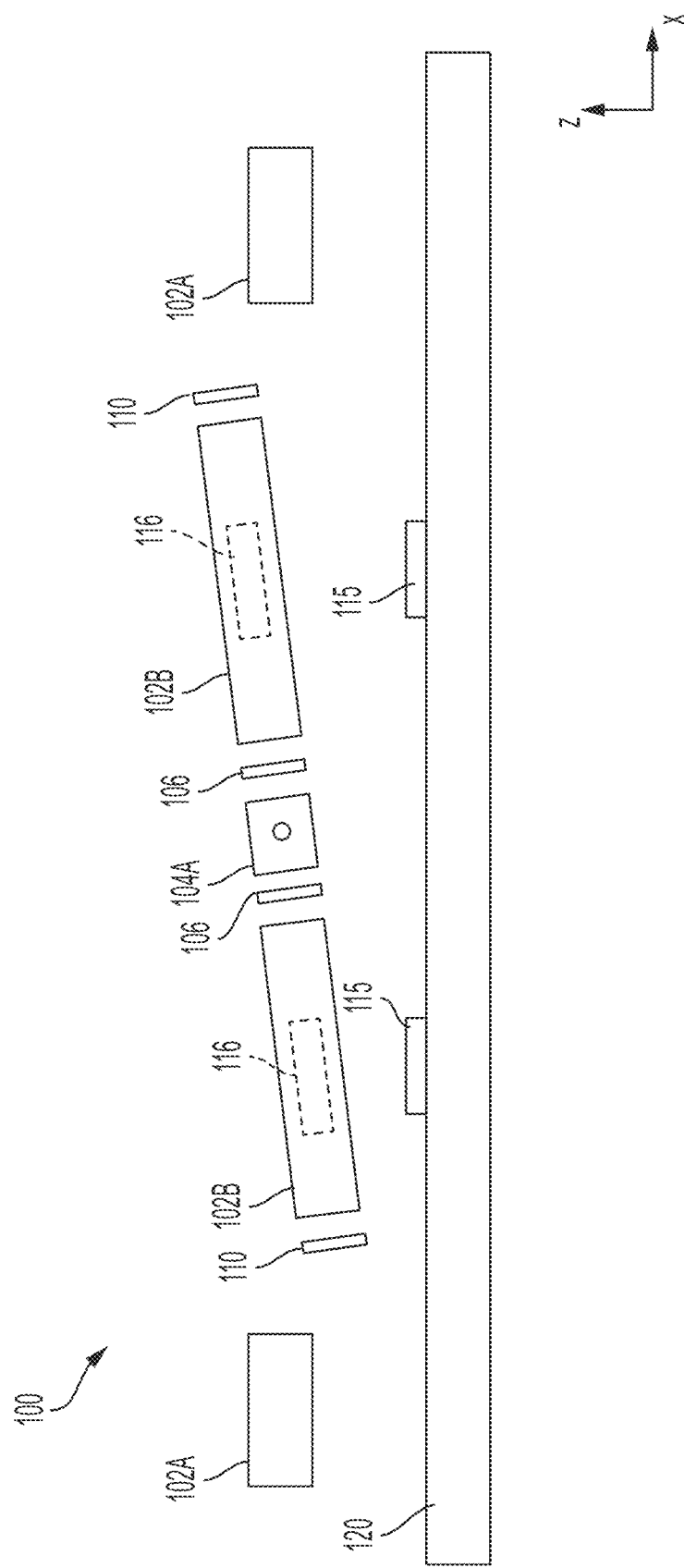
FIG. 2C is an example schematic diagram showing a cross-section of the MEMS device of FIG. 1A along the line B-B' during a tilt mode of operation, according to some embodiments.
Figure 2D:
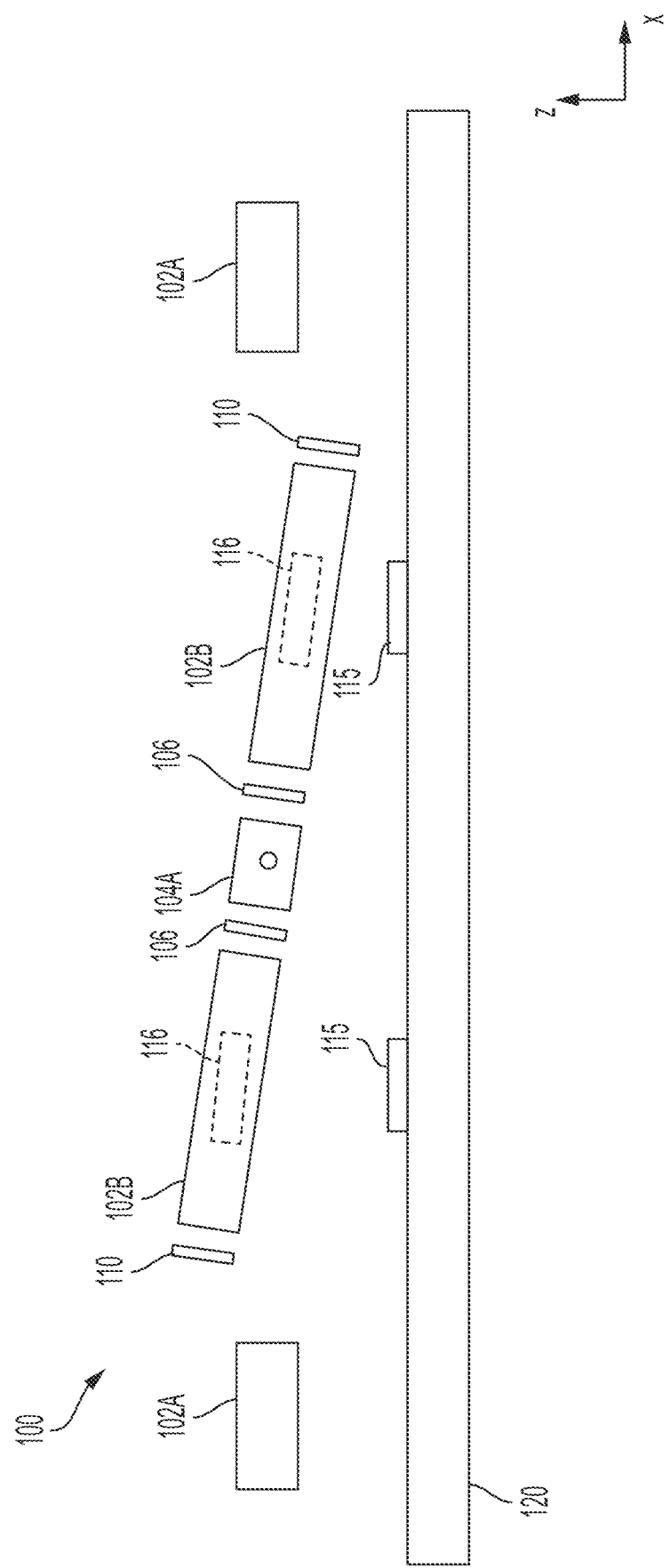
FIG. 2D is another example schematic diagram showing a cross-section of the MEMS device of FIG. 1A along the line B-B' during a tilt mode of operation, according to some embodiments.

FIGS. 2C-2D are example schematic diagrams showing a cross-section of the MEMS device of FIG. 1A along the line B-B' during a tilt mode of operation, according to some embodiments. As described herein, the MEMS device 100 operates by converting a tilt mode of operation which is used by existing accelerometers to a translational mode. Accordingly, FIGS. 2C-2D illustrate an example of tilt mode operation of acceleration which contrasts with the translational mode of operation of the MEMS device 100.

Conventionally, teeter-totter accelerometers have an asymmetric beam to control oscillation. To make the beam heavier on one side, that side is made longer. The electrodes for detecting pivoting cannot be put at the ends of the beam as they would not be placed at the same distance from the pivot point of the beam and the signal acquired would not be a true differential signal. Accordingly, the electrodes must be placed closer to the pivot point of the beam, so that the electrodes are a same distance from the pivot point. However, this means that the electrodes are positioned where the beam experiences relatively less displacement, leading to lower sensitivity. In other words, the displacement able to be sensed by the electrodes is only a fraction of the gap between the beam and the underlying substrate given the electrodes are positioned near the pivot point.

By contrast, the present application provides for a MEMS accelerometer which converts a tilt mode into a translational mode, which allows for the moving masses to cover a greater distance. For example, the respective proof masses are configured to cover nearly the entirety of the gap between the electrode pairs. In some embodiments, the respective proof masses experience at least 10 nm/g displacement for an acceleration along the z-axis.

Figure 3:
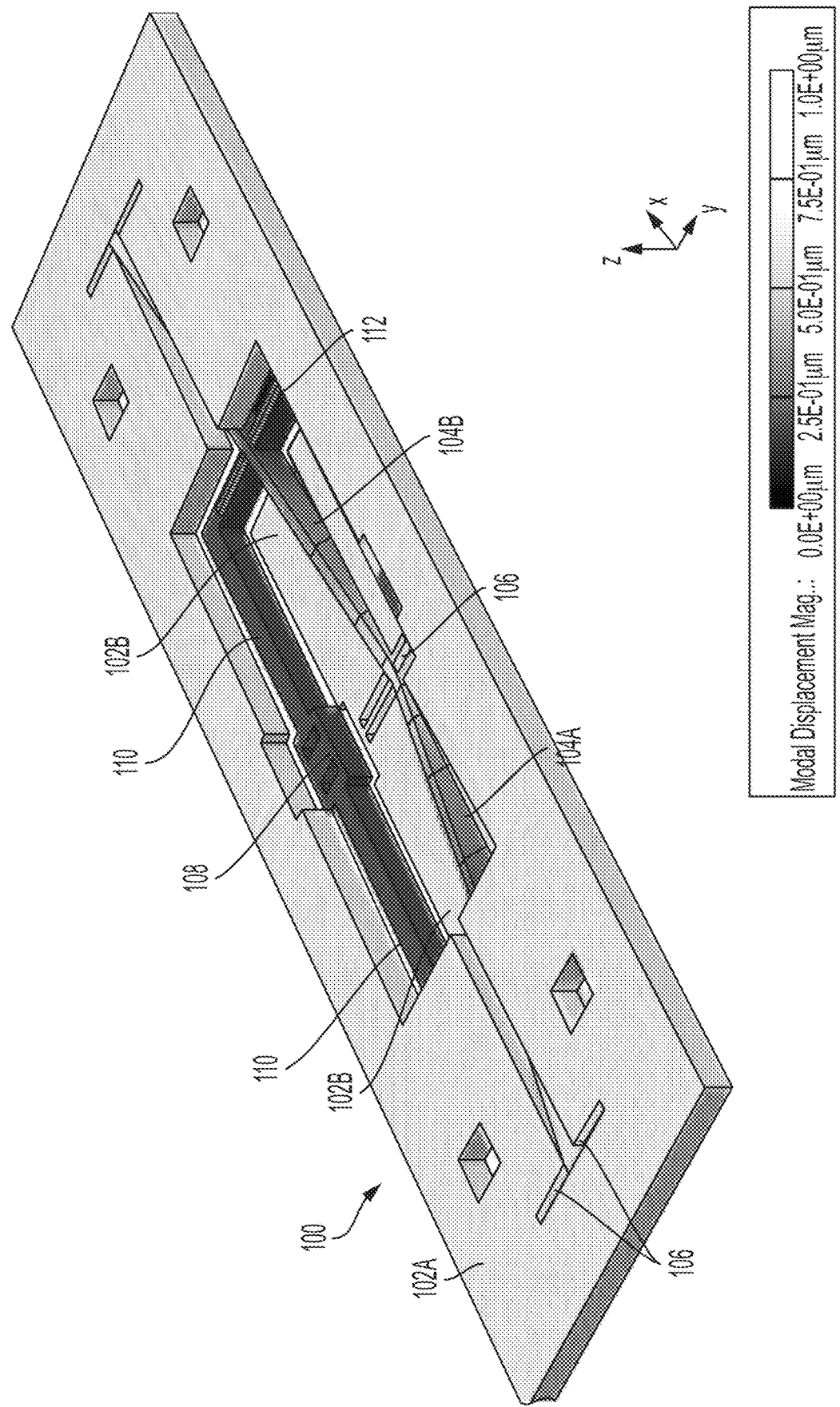
FIGS. 3-4 illustrate translational motion of the MEMS device of FIG. 1A, according to some embodiments.
Figure 4:
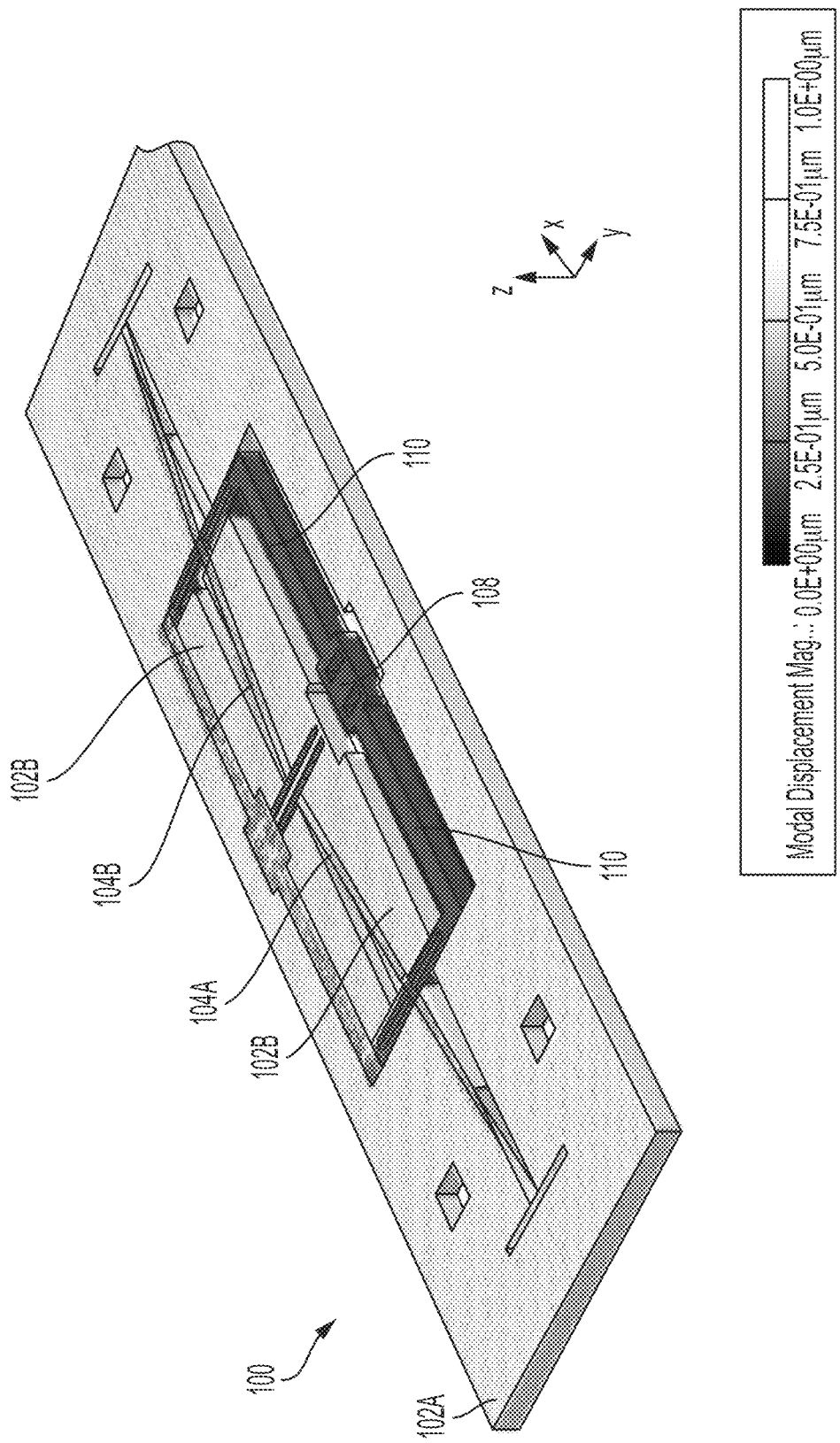

FIGS. 3-4 illustrate translational motion of the MEMS device of FIG. 1A, according to some embodiments. In particular, FIGS. 3-4 illustrate out-of-plane and in-plane motion, respectively, of the MEMS device where the proof masses are translating anti-phase relative to each other.

FIG. 3 illustrates anti-phase out-of-plane motion of the MEMS device of FIG. 1A. The second proof mass 102B moves downwards along the z-axis while the first proof mass 102A moves upwards along the z-axis. This motion is facilitated by the first and second levers 104A-B which move down at ends of first and second levers 104A-B coupled to the second proof mass 102B and up at the ends of the first and second levers 104A-B coupled to the first proof mass 102A.

FIG. 4 illustrates in-plane anti-phase motion of the MEMS device of FIG. 1A. The second proof mass 102B moves upwards along the z-axis while the first proof mass 102B moves downwards along the z-axis. This motion is facilitated by the first and second levers 104A-B which move up at the ends of the first and second levers 104A-B coupled to the second proof mass 102B and down at the ends of the first and second levers 104A-B coupled to the first proof mass 102A.

Displacement of the components of the MEMS device 100 is illustrated via stippling shown in FIGS. 3-4. For example, FIGS. 3-4 illustrate that the anchors 108 and anchor arms 110 exhibit no displacement. Ends of the first and second levers 104A-B exhibit high displacement while midpoints of the first and second levers 104A-B, where tethers 112 are coupled, exhibit relatively little displacement. First and second proof masses 102A-B also exhibit high displacement. As described herein, the high displacement of proof masses to which sensing electrodes are coupled allows for greater sensitivity of the MEMS device.

FIGS. 5A-6B illustrate a second example MEMS device 500, according to some embodiments. The MEMS device 500 illustrates a MEMS accelerometer 500 having two-fold in-plane symmetry, like MEMS device 100, but having an alternate arrangement of components. The MEMS accelerometer 500 may have reduced errors resulting from stress, offset, and/or cross-axis sensitivity due at least in part to the symmetry of the device, like MEMS device 100. The MEMS accelerometer 500, however, does not include levers in-line with a line of symmetry of the device but rather includes two pairs of levers which are parallel to each other and parallel to the x-axis. As opposed to the pair of anchors of the MEMS device 100, the MEMS device 500 includes a single anchor in-line with both axes of symmetry and positioned at the center of mass of the MEMS device.

The MEMS device shown in FIGS. 5A-6B may be a MEMS accelerometer configured to detect z-axis acceleration via translational motion of first and second proof masses 502A-B, also referred to herein as outer and inner proof masses, respectively, which move anti-phase relative to each other and perpendicular relative to an underlying substrate, like the example MEMS device 100 of FIG. 1A. Components of the MEMS device 500 may be configured having some or all of the same features as the components of MEMS device 100.

As shown in FIG. 5A, first and second proof masses 502A-B lie in a plane defined by two perpendicular axes (x- and y-axes). The first and second proof masses 502A-B are configured to translate along a third axis (the z-axis) perpendicular to the plane. The first and second proof masses 502A-B may be configured to translate in opposite directions along the z-axis. For example, the first proof mass 502A may move in a positive direction along the z-axis (e.g., out of the plane defined by the x- and y-axes) when the second proof mass 502B moves in a negative direction along the z-axis (e.g., into the plane defined by the x- and y-axes).

As described herein, the MEMS device 500, like the MEMS device 100, may comprises a MEMS accelerometer. Similarly, the MEMS accelerometer 500 may be configured to detect acceleration along the z-axis. In particular, the first and second proof masses 502A-B may translate in opposite directions in response to an acceleration along the z-axis. Displacement of the first and second proof masses 502A-B may be measured by electrodes coupled to the first and second proof masses 502A-B and an underlying substrate (not shown). The measured displacement of the first and second proof masses 502A-B may be used to determine a measure of acceleration along the z-axis. As described herein, the first and second proof masses 502A-B may be configured to translate anti-phase (e.g., in opposite directions) relative to each other. Accordingly, the signal measured by the electrodes coupled to the MEMS device 500 may be a differential signal.

The first proof mass 502A may be disposed at least partially or entirely surrounding the second proof mass 502B. That is, as shown in the illustrated embodiment of FIG. 5A, the first proof mass 502A may surround the second proof mass 502B in the x-y plane. The second proof mass 502B may be disposed at least partially or entirely within the first proof mass 502A. Accordingly, the first proof mass 502A may be referred to herein as an outer proof mass and the second proof mass 502B may be referred to herein as an inner proof mass. The outer proof mass 502A may act as a frame for the accelerometer. In some embodiments, the relative masses of the inner and outer proof masses may be altered. For example, in some embodiments, the inner proof mass may be lighter than the outer proof mass. In other embodiments, the inner proof mass may be heavier than the outer proof mass.

In some embodiments, the first and second proof masses 502A-B may comprise multiple portions which move together. For example, in the illustrated embodiment, the second proof mass 502B comprises first and second portions coupled together by springs 506. The second proof mass 502B is bisected by the anchor 508 and anchor arms 510, described herein, to form the first and second portions. In some embodiments, one or both of the first and second proof masses 502A-B may comprise a single portion. In some embodiments, one or both of the first and second proof masses 502A-B may comprise more than two portions. The first second proof masses 502A-B and portions thereof may comprise any suitable shape.

Although the example MEMS accelerometer 500 described herein has been described with reference to measuring acceleration along the z-axis, in other embodiments, the MEMS accelerometer 500 may be configured to measure acceleration along one or more other axes, including the x-axis and/or the y-axis. For example, the MEMS accelerometer 500 may include a plurality of electrodes, in addition or alternative to the electrodes described herein, positioned in the x-y plane to sense displacement of the first and second proof masses 502A-B along the x- and/or y-axes.

As shown in FIG. 5A, the first and second proof masses 502A-B may be coupled together by a plurality of levers 504A-B. In particular, each of first, second, third, and fourth levers 504A-D are coupled to each of the first proof mass 502A and the second proof mass 502B at respective ends of the respective levers. The plurality of levers 504A-D may comprise beams suspended over the underlying substrate.

The respective levers 504A-D may be coupled to the first and second proof masses 502A-B via springs 506. Like springs 106, springs 506 may comprise folded springs, in some embodiments, though in other embodiments other springs may be implemented. As shown in the illustrated embodiment, each of the levers 504A-D are coupled to the first and second proof masses 502A-B with a single spring at respective connection points of the levers. However, in other embodiments, two or more springs may be implemented at each connection point.

Like levers 104A-B of MEMS device 100, the plurality of levers 504A-D are configured to facilitate conversion of a tilt mode of the accelerometer into translational motion, such that the first and second proof masses 502A-B translate anti-phase to each other and perpendicular to an underlying substrate in response to z-axis acceleration. For example, when outer ends of the levers 504A-D (e.g., ends of the levers 504A-D that are coupled to the first proof mass 502A) move upwards along the z-axis, inner ends of the levers 504A-D (e.g., ends of the levers 504A-D that are coupled to the second proof mass 502B) move downwards along the z-axis. In turn, when the first proof mass 502A moves upwards along the z-axis, the second proof mass 502B moves downwards along the z-axis. Likewise, when the outer ends of levers 504A-D (e.g., ends of levers 504A-D that are coupled to the first proof mass 502A) move downwards along the z-axis, inner ends of the levers 504A-D (e.g., ends of the levers 504A-D that are coupled to the second proof mass 502B) move upwards along the z-axis. In turn, when the first proof mass 502A moves downwards along the z-axis, the second proof mass 502B moves upwards along the z-axis. Therefore, while the levers 504A-D exhibit teeter-totter motion in response to acceleration along the z-axis, the proof masses 502A-B are configured to translate along the z-axis instead of operating in a tilt mode.

The MEMS accelerometer 500, like MEMS accelerometer 100, exhibits two-fold in-plane symmetry. That is, the MEMS accelerometer 500 is symmetric about two axes (the x- and y-axes). The in-plane symmetry of the MEMS device 500 may be facilitated by several features of the levers 504A-D, in some embodiments. For example, in some embodiments, including the illustrated embodiment, at least two levers of the MEMS accelerometer 500 are disposed in-line with each other. As shown in FIG. 5A, a first pair of levers (first and second levers 504A-B) are disposed in-line with each other. In addition, a second pair of levers (third and fourth levers 504C-D) are disposed parallel to the first pair of levers and in-line with each other. The levers of the MEMS accelerometer 500 may be straight (e.g., having no bends between endpoints of the lever). The positioning and configuration of the levers in-line with each other facilitates the overall symmetry of the accelerometer.

The MEMS device 500 comprises a single anchor 508, coupled to an underlying substrate, for coupling the first and second proof masses 502A-B to the underlying substrate. The anchor 508 is shared among all components of the MEMS device 500.

Each of first and second proof masses 502A-B are coupled to the anchor 508 via the levers 504A-D. In particular, each of the levers 504A-D is coupled to the anchor 508 via tethers 512 which may comprise springs (e.g., folded springs). That is, each proof mass of the first and second proof masses 502A-B is coupled to the anchor 508 via multiple connections (e.g., two connections to the anchor 508 per proof mass, in the illustrated embodiment). The respective tethers 512 may be coupled to a respective lever of the MEMS device 500 at a point on the respective lever that is closer to an end of the lever that is coupled to the second (inner) proof mass 502B.

The MEMS device 500 comprises multiple anchor arms 510. Each of the anchor arms 510 are coupled to the anchor 508. Like anchor arms 110, the anchor arms 510 may comprise rigid beams directly coupled to and extending outwardly from the anchor 508. The anchor arms 510 may be stationary relative to the other components of the MEMS device 500. The anchor arms 510 effectively extend the size of the space for coupling components to the anchor 508 without increasing the actual size of the anchor 508 which is coupled to the substrate and therefore may facilitate coupling multiple components to the single anchor of the MEMS device 500 without needing to increase the number of anchors on the MEMS device or consuming space on the underlying substrate.

As described herein, the anchor 508 is shared among all components of the MEMS device 500. The anchor 508 is disposed in a center of the MEMS device 500, including in a center of mass of the MEMS device which reduces issues related to signal offset, as described herein. In addition, the anchor 508 is disposed along both the lines of symmetry of the MEMS device 500.

FIGS. 5A-6B illustrate additional views of the example MEMS device 500 of FIG. 5A, according to some embodiments. FIG. 5B is a schematic diagram illustrating the in-plane symmetry of the MEMS device 500. As described herein, the MEMS device 500 is symmetric about both the x- and y-axes. FIG. 5B illustrates perpendicular $x_2$ and $y_2$ axes overlaid on the MEMS device 500 to illustrate the two-fold in-plane symmetry of the MEMS device 500. Symmetry of the MEMS device 500 may be facilitated by the single anchor 508 shared among components of the MEMS device 500 and in-line with two lines of symmetry, in some embodiments. In some embodiments, positioning of at least two levers in-line with each other, and in parallel with other pair(s) of in-line levers may facilitate the symmetry of the MEMS device 500. The symmetry of the MEMS device helps to reduce errors associated with the MEMS device, including offset, cross-axis sensitivity, and errors due to stress.

Figure 5C:
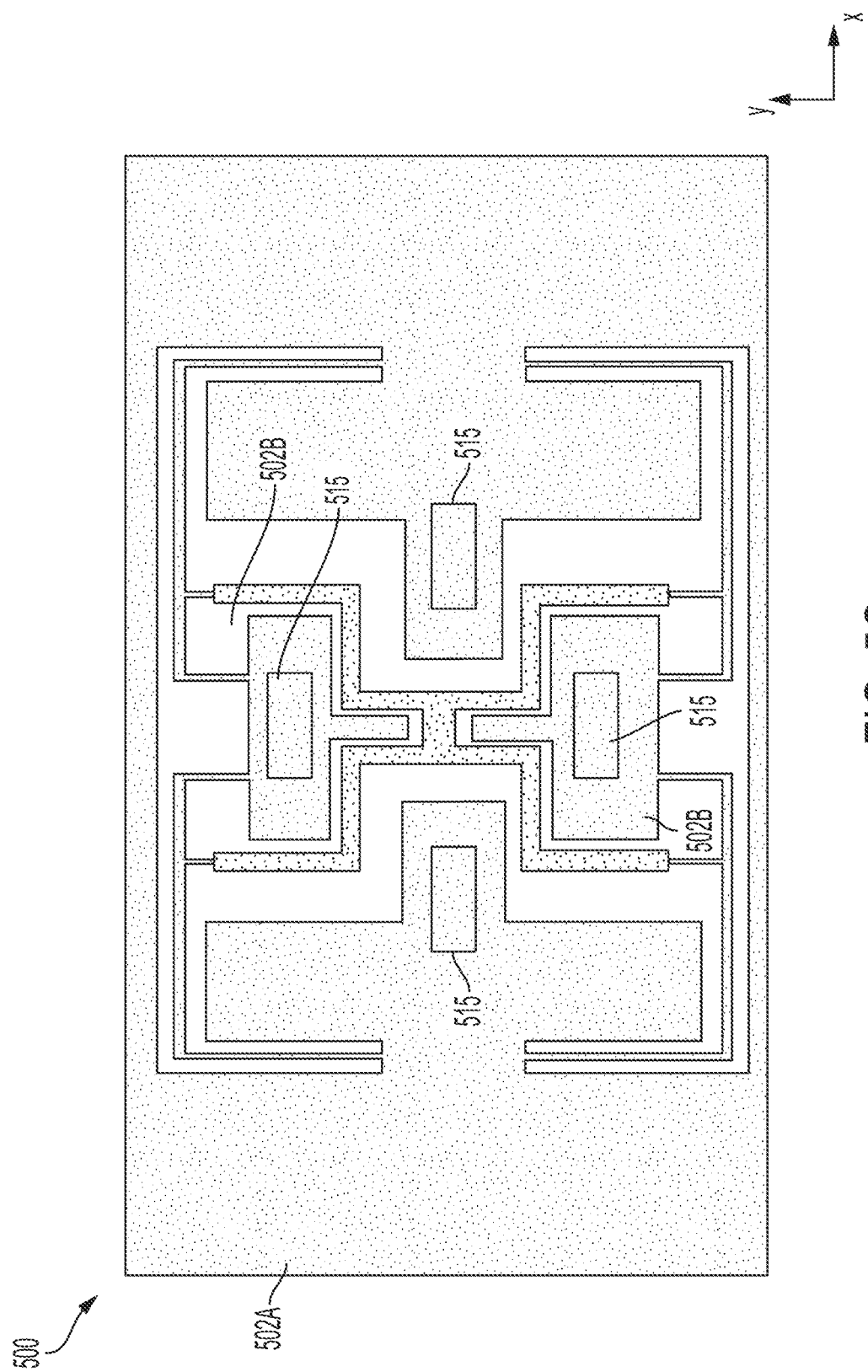
FIG. 5C is another schematic diagram of the MEMS device of FIG. 5A illustrating underlying electrodes of the MEMS device, according to some embodiments.

FIG. 5C is another schematic diagram of the MEMS device 500. FIG. 5C illustrates the MEMS device 500 showing underlying electrodes which facilitate sensing acceleration of the MEMS device 500.

As described herein, the MEMS device 500 comprises an underlying substrate distanced from the first and second proof masses 502A-B along the z-axis. Displacement of the first and second proof masses 502A-B may be measured by pairs of electrodes, with a first electrode of the pair disposed on the substrate and a second electrode of the pair disposed on one of the first or second proof masses 502A-B. As the first and second proof masses 502A-B translate along the z-axis, a gap between the respective electrodes of a pair of electrodes changes. The change in gap results in a change in capacitance and therefore displacement of the respective proof masses may be determined based on the signals produced by the electrode pair.

FIG. 5C illustrates the positioning of electrodes 515 coupled to the substrate. As shown in FIG. 5C, there may be at least one electrode 515 disposed beneath each of the first and second proof masses 502A-B. In some embodiments, such as shown in the illustrated embodiment, there may be a plurality of electrodes 515 disposed beneath each of the first and second proof masses 502A-B. As described herein, each of the electrodes 515 may be disposed opposite a complementary electrode coupled to an underside of one of the first or second proof masses 502A-B, such that the complementary electrode faces the respective electrode 515 coupled to the substrate.

Figure 6A:
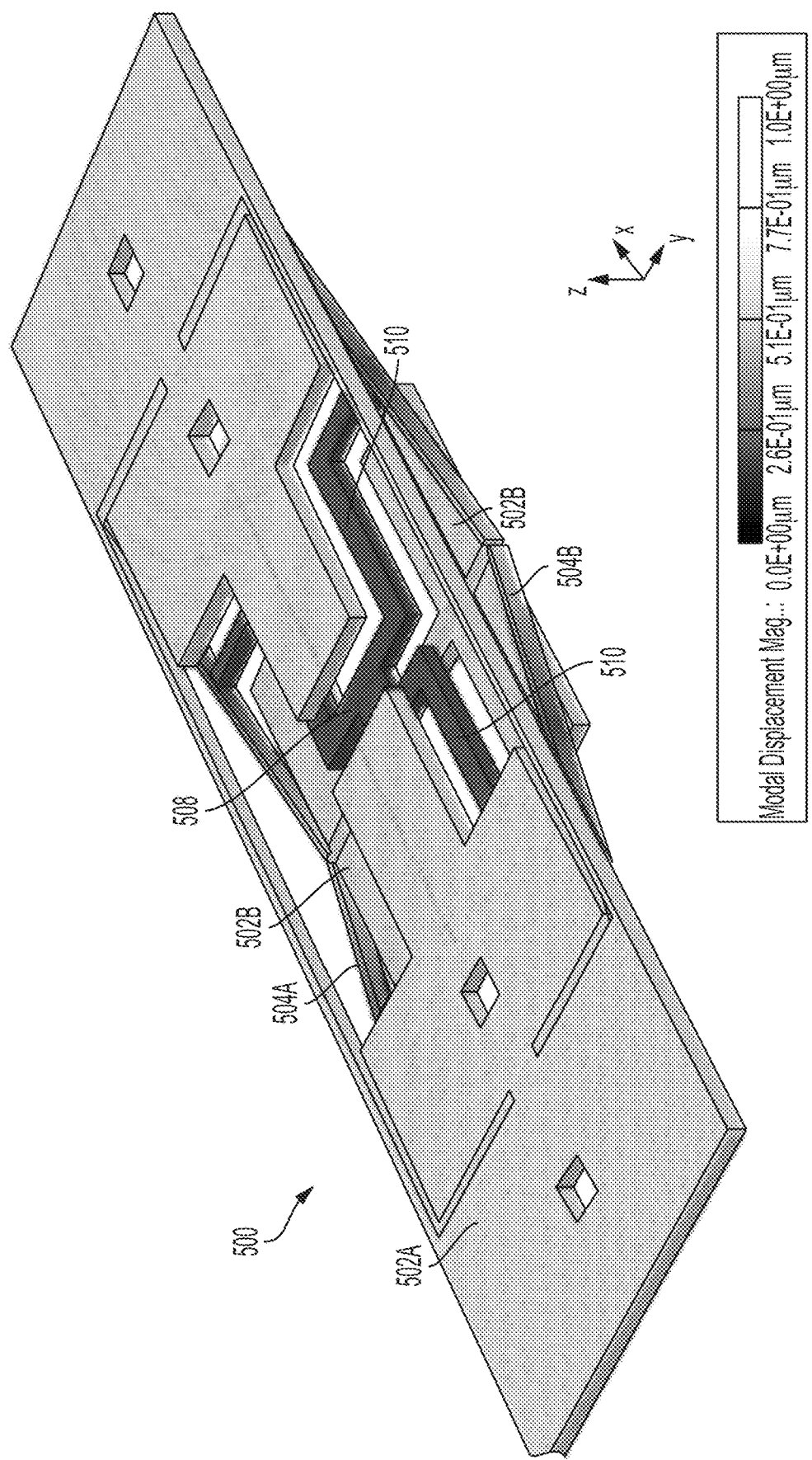
FIGS. 6A-6B illustrate translational motion of the MEMS device of FIG. 5A, according to some embodiments.
Figure 6B:
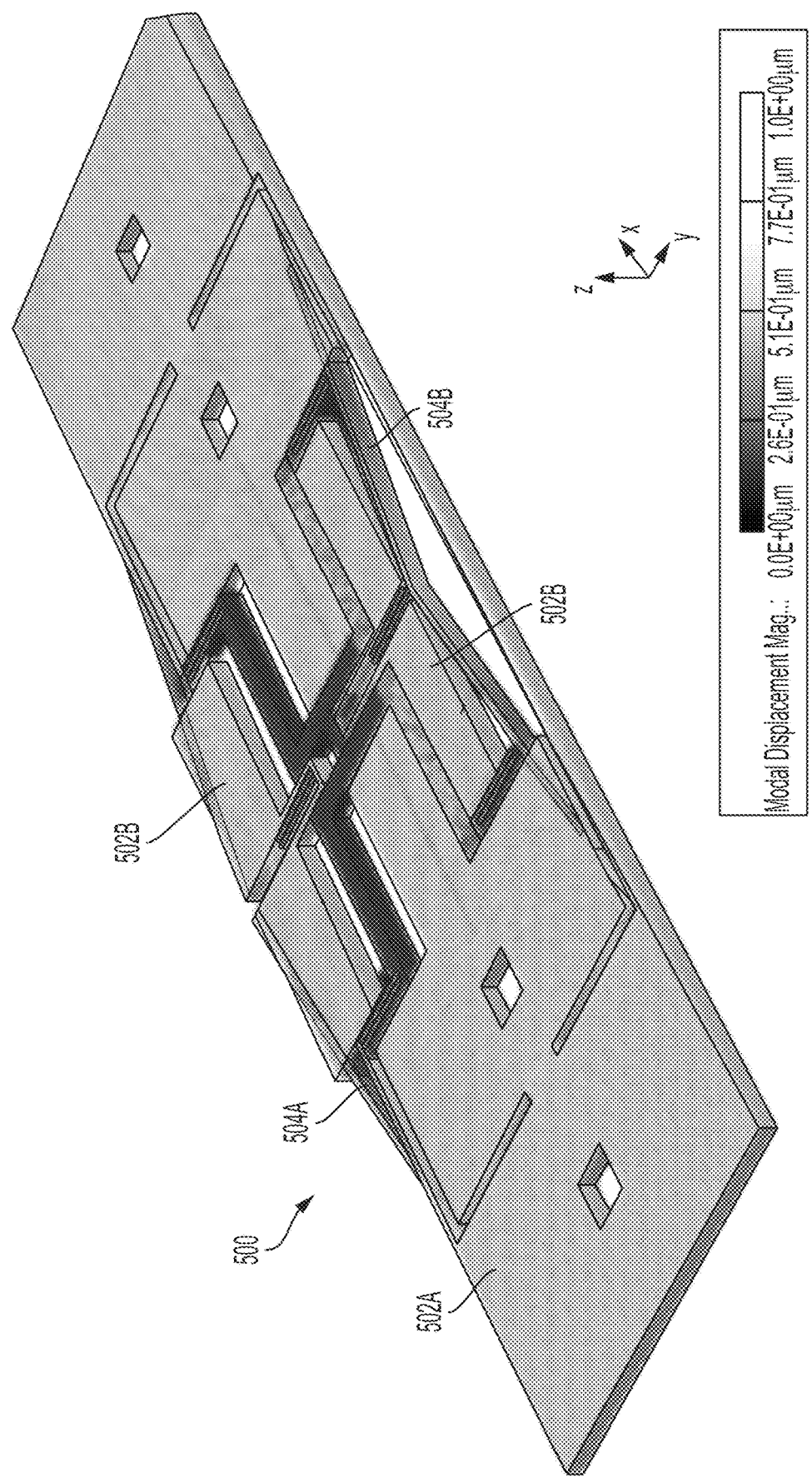

FIGS. 6A-6B illustrate translational motion of the MEMS device of FIG. 5A, according to some embodiments. In particular, FIGS. 6A-6B illustrates motion of the MEMS device where the proof masses are translating anti-phase relative to each other.

In the illustrated embodiment of FIG. 6A, the second proof mass 502B moves downwards along the z-axis while the first proof mass 502A moves upwards along the z-axis. This motion is facilitated by the levers 504A-D which move down at ends of the levers 504A-D coupled to the second proof mass 502B and up at the ends of the levers 504A-D coupled to the first proof mass 502A.

In the illustrated embodiment of FIG. 6B, the second proof mass 502B moves upwards along the z-axis while the first proof mass 502B moves downwards along the z-axis. This motion is facilitated by the levers 504A-D which move up at the ends of the levers 504A-D coupled to the second proof mass 502B and down at the ends of the levers 504A-D coupled to the first proof mass 502A.

Displacement of the components of the MEMS device 500 is illustrated via stippling shown in FIGS. 6A-6B. For example, FIGS. 6A-6B illustrate that the anchor 508 and anchor arms 510 exhibit no displacement. Ends of the levers 504A-D exhibit high displacement while midpoints of the levers 504A-B, where tethers 512 are coupled, exhibit relatively little displacement. First and second proof masses 502A-B also exhibit high displacement. As described herein, the high displacement of proof masses to which sensing electrodes are coupled allows for greater sensitivity of the MEMS device.

MEMS accelerometers of the types described herein may form part of various systems with applications in a variety of fields, such as in sports, military, virtual reality, gaming, healthcare, and industrial setting, among others. The various systems may form part of, or be used, in an Internet of Things network. Examples of such systems and applications are now described.

Figure 7:
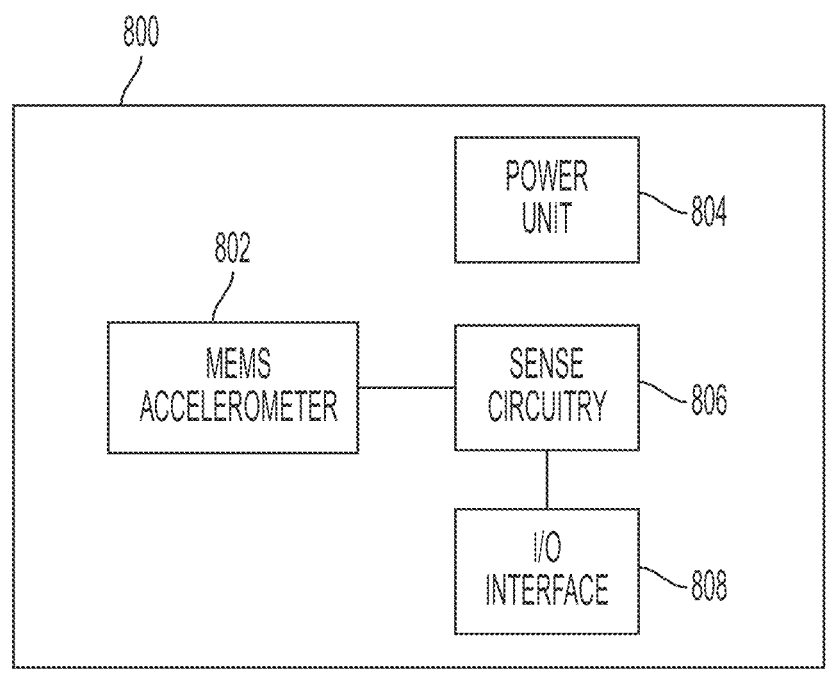
FIG. 7 is a schematic diagram of a MEMS inertial sensor, according to some embodiments.

FIG. 7 is a block diagram illustrating a system 800, which may include a MEMS accelerometer 802, a power unit 804, sense circuitry 806 and input/output (I/O) interface 808. MEMS accelerometer 802 may be implemented as any one of the MEMS accelerometers described above. Optionally, MEMS accelerometer 802 may further include an angular accelerometer and/or a gyroscope. In some embodiments, sense circuitry 806 and MEMS accelerometer 802 may be disposed on the same substrate, such as a silicon substrate. In other embodiments, sense circuitry 806 and MEMS accelerometer 802 may be disposed on separate substrates, which may be bonded to one another and/or packaged within a common housing.

Sense circuitry 806 may be configured to sense acceleration, for example by mapping capacitance variations to magnitude of acceleration. Sense circuitry 806 may comprise an amplifier, an analog-to-digital converter, a memory, a processor, an application-specific integrated circuit (ASIC) or other analog and/or digital circuits.

System 800 may periodically transmit, via wired connections or wirelessly, signal that are indicative of sensed angular and/or linear acceleration to an external monitoring system, such as a computer, a smartphone, a tablet, a smartwatch, smartglasses, or any other suitable receiving device. I/O interface 808 may be configured to transmit and/or receive data via Wi-Fi, Bluetooth, Bluetooth Low Energy (BLE), Zigbee, Thread, ANT, ANT+, IEEE 802.15.4, IEEE 802.11.ah, or any other suitable wireless communication protocol. Alternatively, or additionally, /O interface 808 may be configured to transmit and/or receive data using proprietary connectivity protocols. I/O interface 808 may comprise one or more antennas, such as a microstrip antenna. In some embodiments, I/O interface 808 may be connected to a cable, and may be configured to transmit and/or receive signals through the cable.

System 800 may be powered using power unit 804. Power unit 804 may be configured to power sense circuitry 806, I/O interface 808, and/or MEMS accelerometer 802. In some embodiments, power unit 804 may comprise one or more batteries. System 800 may, in at least some embodiments, consume sufficiently little power to allow for its operation for extended periods based solely on battery power. The battery or batteries may be rechargeable in some embodiments. Power unit 804 may comprise one or more lithium-ion batteries, lithium polymer (LiPo) batteries, super-capacitor-based batteries, alkaline batteries, aluminum-ion batteries, mercury batteries, dry-cell batteries, zinc-carbon batteries, nickel-cadmium batteries, graphene batteries or any other suitable type of battery. In some embodiments, power unit 804 may comprise circuitry to convert AC power to DC power. For example, power unit 804 may receive AC power from a power source external to system 800, such as via I/O interface 808, and may provide DC power to some or all the components of system 800. In such instances, power unit 804 may comprise a rectifier, a voltage regulator, a DC-DC converter, or any other suitable apparatus for power conversion.

Power unit 804 may comprise energy harvesting components and/or energy storage components, in some embodiments. Energy may be harvested from the surrounding environment and stored for powering the system 800 when needed, which may include periodic, random, or continuous powering. The type of energy harvesting components implemented may be selected based on the anticipated environment of the system 800, for example based on the expected magnitude and frequency of motion the system 800 is likely to experience, the amount of stress the system is likely to experience, the amount of light exposure the system is likely to experience, and/or the temperature(s) to which the system is likely to be exposed, among other possible considerations. Examples of suitable energy harvesting technologies include thermoelectric energy harvesting, magnetic vibrational harvesting, electrical overstress harvesting, photovoltaic harvesting, radio frequency harvesting, and kinetic energy harvesting. The energy storage components may comprise supercapacitors in some embodiments.

Figure 8C:
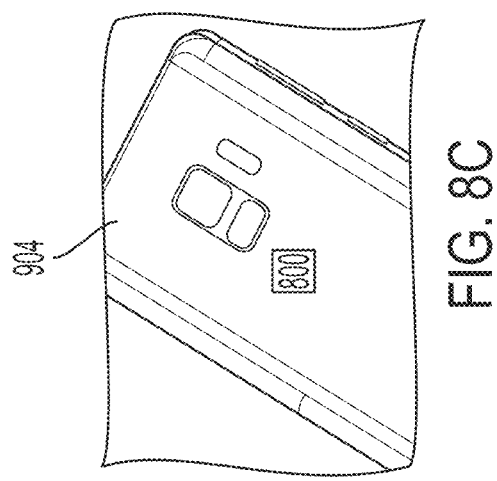
FIGS. 8A-8C illustrates example devices in which the MEMS inertial sensor of FIG. 7 may be implemented, according to some embodiments.
Figure 8B:
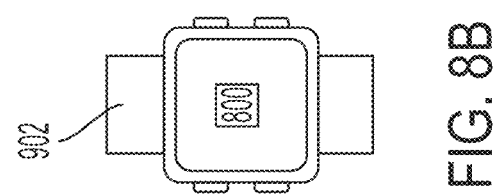
Figure 8A:
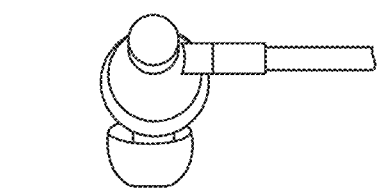
Figure 8A:
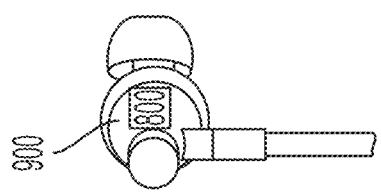

As shown in FIGS. 8A-8C, system 800 may be deployed in various settings to detect acceleration, including sports, healthcare, military, virtual reality, gaming, and industrial applications, among others. A system 800 may be part of a wearable device in some embodiments. For example, system 800 may be mounted as part of an earbud 900 (as shown in FIG. 8A), as part of a smartwatch 902 (as shown in FIG. 8B), or as part of a smartphone 904 (as shown in FIG. 8C). Other environments in which a system 800 may be deployed include tablets, laptops, smartglasses, medical devices, sports equipment, vehicles, among many others.

When mounted on an earbud 900, system 800 may be used to monitor motion of a user's head, for example for virtual reality or gaming applications. Additionally, or alternatively, system 800 may be used to enable voice recognition. For example, system 800 may detect vibrations generated by the voice of a user, and may use machine leaning technique to recognize speech. Additionally, or alternatively, system 800 may be used for noise cancellation. When mounted on a smartwatch 902, system 800 may detect motion of a user's arm, for example for sleep tracking, heart monitoring, step counting, among others. Similarly, when mounted on a smartphone 904, system 800 may detect motion of a specific part of a user's body.

Aspects of the technology described herein may provide one or more benefits, some of which have been previously described. Now described are some examples of such benefits. It should be appreciated that not all aspects and embodiments necessarily provide all of the benefits now described. Further, it should be appreciated that aspects of the technology described herein may provide additional benefits to those now described.

The example accelerometers described herein comprise a number of features which increase the overall symmetry of the accelerometers (e.g., resulting in total in-plane symmetry of the device), leading to reduced errors and increased sensor accuracy. Further aspects of the example accelerometers described herein are illustrated in the figures attached hereto.

Although the MEMS devices have been described herein being configured to measure acceleration along the z-axis, the MEMS devices described herein may be implemented for sensing acceleration about one or more additional or alternative axes (e.g., the x- and/or y-axes). For example, in some embodiments, the MEMS device may be configured to detect in-plane acceleration (e.g., along the x- and/or y-axes) in addition or alternative to detection of z-axis acceleration. In-plane acceleration may be detected via detection of in-plane translation of the first and/or second proof masses along the x- and/or y-axes. The first and second proof masses may translate anti-phase relative to each other and a differential signal may be obtained. In some embodiments, additional sensing electrodes may be coupled to the first and second proof masses and the underlying substrate of the MEMS device to allow for sensing acceleration about one or more additional or alternative axes. For example, one or more electrodes may be coupled to the first and/or second proof masses (e.g., integrated inside the first and/or second proof masses) for sensing the in-plane translation of the first and/or second proof masses.

The terms "approximately", "substantially," and "about" may be used to mean within ±20% of a target value in some embodiments, within ±10% of a target value in some embodiments, within ±5% of a target value in some embodiments, and within ±2% of a target value in some embodiments. The terms "approximately," "substantially," and "about" may include the target value.

What is claimed is:

1. A microelectromechanical systems (MEMS) accelerometer comprising:
   a substrate disposed in a plane defined by a first axis and a second axis perpendicular to the first axis;
   a first proof mass and a second proof mass coupled to the substrate and configured to translate in opposite directions of each other along a third axis perpendicular to the first and second axes, wherein the first axis is perpendicular to a length of the first proof mass;
   a first lever coupled to the first proof mass and the second proof mass; and
   a second lever coupled to the first proof mass and the second proof mass, wherein:
      the first and second levers are disposed in-line with the first axis;
      the MEMS accelerometer is configured to detect acceleration along the third axis via detection of translation of the first and second proof masses along the third axis; and
      the MEMS accelerometer exhibits symmetry about the first and second axes.

2. The MEMS accelerometer of claim 1, wherein each of the first and second levers are straight.

3. The MEMS accelerometer of claim 1, wherein inner ends of each of the first and second levers move in a first direction along the third axis when outer ends of each of the first and second levers moving in a second direction along the third axis opposite the first direction.

4. The MEMS accelerometer of claim 1, wherein the first and second proof masses are coupled to the substrate via at least one anchor disposed in-line with at least one of the first axis or the second axis.

5. The MEMS accelerometer of claim 4, wherein the at least one anchor comprises first and second anchors, and wherein each of the first and second proof masses are coupled to each of the first and second anchors.

6. The MEMS accelerometer of claim 5, further comprising first and second anchor arms coupled to the first anchor, wherein the first and second anchor arms comprise rigid beams extending outwardly from the first anchor on opposite sides of the first anchor.

7. The MEMS accelerometer of claim 6, wherein the first lever is coupled to each of the first and second anchor arms at a midpoint of the first lever.

8. A microelectromechanical systems (MEMS) accelerometer comprising:
   a substrate disposed in a plane defined by a first axis and a second axis perpendicular to the first axis;
   a first proof mass and a second proof mass coupled to the substrate and configured to translate in opposite directions of each other along a third axis perpendicular to the first and second axes, wherein the second proof mass is disposed within the first proof mass and the second proof mass is disposed between first and second anchors coupled to the substrate in a direction along the second axis; and
   at least one lever coupling the first proof mass to the second proof mass, wherein:
      the MEMS accelerometer is configured to detect acceleration along the third axis via detection of translation of the first and second proof masses along the third axis; and
      the MEMS accelerometer exhibits symmetry about the first and second axes.

9. A microelectromechanical systems (MEMS) accelerometer comprising:
   a substrate disposed in a plane defined by a first axis and a second axis perpendicular to the first axis;
   a first proof mass and a second proof mass coupled to the substrate via an anchor and configured to translate in opposite directions of each other along a third axis perpendicular to the first and second axes;
   at least one lever coupling the first proof mass to the second proof mass; and
   first and second anchor arms coupled to the anchor and comprising rigid beams extending outwardly from the anchor on opposite sides of the anchor, wherein:
      the at least one lever is coupled to the first anchor arm at a midpoint of the at least one lever;
      the MEMS accelerometer is configured to detect acceleration along the third axis via detection of translation of the first and second proof masses along the third axis;
      the MEMS accelerometer exhibits symmetry about the first and second axes; and
      wherein the MEMS accelerometer is further configured to detect acceleration along the first and/or second axes via detection of translation of the first and second proof masses along the first and/or second axes.

10. A microelectromechanical systems (MEMS) accelerometer, comprising:
    a substrate disposed in a plane defined by a first axis and a second axis perpendicular to the first axis;
    a first proof mass coupled to the substrate via an anchor disposed in a center of the MEMS accelerometer;
    a second proof mass coupled to the substrate via the anchor and to the first proof mass;
    a first lever coupled to the first proof mass and the second proof mass; and
    a second lever coupled to the first proof mass and the second proof mass, wherein:
       the first and second proof masses are configured to translate along a third axis perpendicular to the first and second axes in response to acceleration along the third axis; and
       the MEMS accelerometer exhibits symmetry about the first and second axes.

11. The MEMS accelerometer of claim 10, further comprising:
    a third lever coupled to the first proof mass and the second proof mass; and
    a fourth lever coupled to the first proof mass and the second proof mass.

12. The MEMS accelerometer of claim 11, wherein each of the first, second, third, and fourth levers are coupled to the anchor.

13. The MEMS accelerometer of claim 12, further comprising a plurality of anchor arms coupled to the anchor, wherein each anchor arm of the plurality of anchor arms comprises a rigid beam extending outwardly from the anchor and being coupled to a respective one of the first, second, third, or fourth levers.

14. The MEMS accelerometer of claim 10, wherein the second proof mass is disposed within the first proof mass and a mass of the second proof mass is less than a mass of the first proof mass.

15. The MEMS accelerometer of claim 14, wherein the first proof mass translates in a first direction along the third axis when the second proof mass translates in a second direction along the third axis opposite the first direction.

16. A microelectromechanical systems (MEMS) accelerometer, comprising:
   a substrate disposed in a plane defined by a first axis and a second axis perpendicular to the first axis;
   a first proof mass coupled to the substrate;
   a second proof mass coupled to the substrate and to the first proof mass, wherein the second proof mass is disposed between first and second anchors coupled to the substrate in a direction along the second axis; and
   first and second levers coupled to each of the first and second proof masses and disposed in-line with each other, wherein:
      the first and second proof masses are configured to translate along a third axis perpendicular to the first and second axes in response to acceleration along the third axis; and
      the MEMS accelerometer exhibits symmetry about the first and second axes.

17. The MEMS accelerometer of claim 16, wherein each of the first and second levers are coupled to the first anchor coupled to the substrate and the second anchor coupled to the substrate.

18. The MEMS accelerometer of claim 16, wherein the first and second levers are disposed in-line with the first axis.

* * * * *